United States Patent [19]
Gleaves et al.

[11] Patent Number: 5,548,681
[45] Date of Patent: Aug. 20, 1996

[54] SPEECH DIALOGUE SYSTEM FOR REALIZING IMPROVED COMMUNICATION BETWEEN USER AND SYSTEM

[75] Inventors: David Gleaves; Yoshifumi Nagata; Yoichi Takebayashi, all of Kanagawa-ken, Japan

[73] Assignee: Kabushiki Kaisha Toshiba, Kawasaki, Japan

[21] Appl. No.: 929,106

[22] Filed: Aug. 13, 1992

[30] Foreign Application Priority Data

Aug. 13, 1991 [JP] Japan ................................. 3-202957
Mar. 16, 1992 [JP] Japan ................................. 4-058338

[51] Int. Cl.⁶ ........................... G10L 5/06; G10L 9/14; G10L 3/02
[52] U.S. Cl. ................... 395/2.42; 395/2.35; 395/2.65
[58] Field of Search .............................. 395/2.35–2.37, 395/2.42, 2.4, 2, 2.65; 381/41–43, 46, 47

[56] References Cited

U.S. PATENT DOCUMENTS

| | | | |
|---|---|---|---|
| 4,852,181 | 7/1989 | Morito et al. | 395/2.42 |
| 4,905,288 | 2/1990 | Gerson et al. | 381/43 |
| 4,937,871 | 6/1990 | Hattori | 395/2.42 |

OTHER PUBLICATIONS

Widrow et al., "Adaptive Noise Cancelling: Principles and Applications,"Proceeding of the IEEE, vol. 63, No. 12, Dec 1975, pp. 1692–1716.

McAulay, "Optimum Speech Classification and its Application to Adaptive Noise cancellation," IEEE ICASSP, May 1977, pp. 425–428.

*Primary Examiner*—David D. Knepper
*Attorney, Agent, or Firm*—Oblon, Spivak, McClelland, Maier & Neustadt, P.C.

[57] ABSTRACT

In the system, a speech input uttered by a human is received by a microphone which outputs microphone output signals. The speech input received by the microphone is then recognized by a speech recognition unit, and a synthetic speech response appropriate for the speech input recognized by the speech recognition unit is generated and outputted from a loudspeaker to the human. In recognizing the speech input, the speech recognition unit receives input signals in which the synthetic speech response, outputted from the loudspeaker and then received by the microphone, is cancelled from the microphone output signals.

16 Claims, 29 Drawing Sheets

FIG.24A

|  | ORDER | PHRASES | SYLLABLE/PITCH | IMPORTANCE |
|---|---|---|---|---|
| NORMAL CONFIRMATION RESPONSE | 1 | きのう | Ki ↗ no H | NORMAL |
|  | 2 | 来た | Ki ↘ ta | NORMAL |
|  | 3 | メールの | me ↗H ru no | NORMAL |
|  | 4 | リストの | ri ↘ su to no | NORMAL |
|  | 5 | 表示ですね | hjo ↗H zi de ↘ su ne | NORMAL |

FIG.24B

|  | ORDER | PHRASES | SYLLABLE/PITCH | IMPORTANCE |
|---|---|---|---|---|
| CONFIRMATION RESPONSE WITH EMPHASIS ON "きのう" | 1 | きのう | Ki ↗ no H | IMPORTANT |
|  | 2 | 来た | Ki ↘ ta | NORMAL |
|  | 3 | メールの | me ↗H ru no | NORMAL |
|  | 4 | リストの | ri ↘ su to no | NORMAL |
|  | 5 | 表示ですね | hjo ↗H zi de ↘ su ne | NORMAL |

FIG.24C

|  | ORDER | PHRASES | SYLLABLE/PITCH | IMPORTANCE |
|---|---|---|---|---|
| CONFIRMATION RESPONSE WITH EMPHASIS ON "表示" | 1 | きのう | Ki ↗ no H | NORMAL |
|  | 2 | 来た | Ki ↘ ta | NORMAL |
|  | 3 | メールの | me ↗H ru no | NORMAL |
|  | 4 | リストの | ri ↘ su to no | NORMAL |
|  | 5 | 表示ですね | hjo ↗H zi de ↘ su ne | IMPORTANT |

FIG.24D

|  | ORDER | PHRASES | SYLLABLE/PITCH | IMPORTANCE |
|---|---|---|---|---|
| WARNING RESPONSE WITH EMPHASIS | 1 | ホスト | ho ↘ su to | NORMAL |
|  | 2 | panda から | pa ↘ N da ka ra | IMPORTANT |
|  | 3 | 応答が | o ↗ H to H ga | NORMAL |
|  | 4 | ありません | a ↗ ri ma se ↘ N | NORMAL |

FIG.24E

|  | ORDER | PHRASES | SYLLABLE/PITCH |
|---|---|---|---|
| WARNING RESPONSE WITH HIGH OVERALL IMPORTANCE | 1 | ホスト | ho ↘ su to |
|  | 2 | panda から | pa ↘ N da ka ra |
|  | 3 | 応答が | o ↗ H to H ga |
|  | 4 | ありません | a ↗ ri ma se ↘ N |

FIG.26
| ORDER | PHRASES | TIME PERIOD |
|---|---|---|
| 1 | きのう | 400ms |
| 2 | 来た | 260ms |
| 3 | メールの | 440ms |
| 4 | リストの | 500ms |
| 5 | 表示ですね | 600ms |
| RESPONSE OUTPUT STARTING TIME | | __O'CLOCK __MINITES __SECONDS |
FIG.27
| INTERRUPT | DO NOT / DO |
|---|---|
| UTTERANCE SPEED | FASTER / SAME / SLOWER |
| INTONATION | LARGER CHANGE / SAME / SMALLER CHANGE |
| POWER | UP / SAME / DOWN |
| CONTROL START TIMING | 4TH PHRASE |
FIG.28
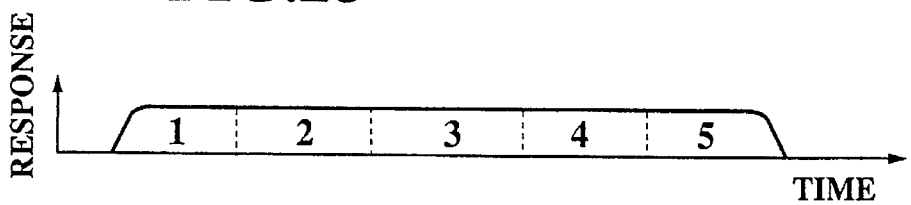
FIG.29
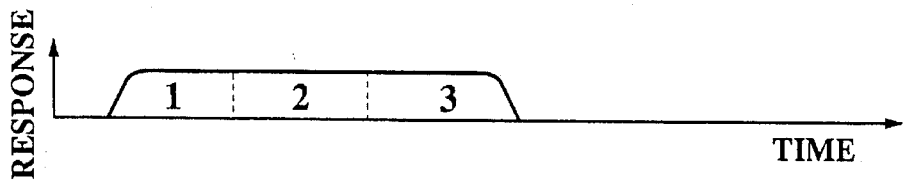

FIG.36

| COMPREHENDED INPUT CONTENT | IMPORTANCE |
|---|---|
| CONSENT | LOW |
| DENIAL / CORRECTION | NORMAL |
| NORMAL INPUT / ADDITION | NORMAL |
| RESPONSE INTERRUPTION | HIGH |

FIG.37

| DETERMINED RESPONSE CONTENT | IMPORTANCE |
|---|---|
| GREETING | LOW |
| CONFIRMATION | NORMAL |
| COMMAND | NORMAL |
| WARNING | HIGH |

SPEECH DIALOGUE SYSTEM FOR REALIZING IMPROVED COMMUNICATION BETWEEN USER AND SYSTEM

BACKGROUND OF THE INVENTION

1. Field of the Invention

The present invention relates to a speech dialogue system for interfacing the man and the computer in a form of a dialogue using speech data.

2. Description of the Background Art

In recent years, the development of the speech dialogue system using the speech data as an interface between the man and the computer has been advanced considerably.

In a speech dialogue system, which is useful in a multi-media dialogue system for displaying the visual data such as a graphic data and image data along with the speech data output, when the human speaker utters speech messages toward the microphone, the system recognizes these speech messages, and outputs the appropriate response in speech data from a loudspeaker, so as to carry out the dialogue with the human speaker.

For example, such a speech dialogue system may be employed in a hamburger shop for taking the order from the customer. In this case, when the customer utters the order such as "Two hamburgers and three orange juices" toward the microphone, the system recognizes this speech input, and outputs the synthetic speech response for making a confirmation such as "Is it two hamburgers and three orange juices that you have just ordered?". In response to this synthetic speech response, when the customer utters "Yes", the recognized speech content is confirmed, and subsequently notified to the shop worker.

In such a conventional speech dialogue system, however, in a case the customer uttered "Three hamburgers . . ." by mistake, it is not possible for the customer to make a correction immediately, and the customer must deny the synthetic speech response such as "Is it three hamburgers . . .?" for making a confirmation from the system first, and then make the correct speech input such as "Two hamburgers . . ." again.

Moreover, in a case the customer uttered "Two hamburgers, one coke, and one ice cream, please", and the system erroneously recognized this speech input and outputs the synthetic speech response "Is it four potatoes, one coke, and one ice cream you have just ordered?", the customer may very well be tempted to make a correction by interrupting the synthetic speech response as soon as the synthetic speech response reaches to a portion ". . . four potatoes . . .", but even in such a case, in a conventional speech dialogue system, the customer cannot make the correction until the output of the entire synthetic speech response is completed.

For these reasons, in a conventional speech dialogue system, the dialogue often requires a considerable amount of time, and it can be quite cumbersome.

In other words, in a conventional speech dialogue system, it has not been possible to carry out the reception of the speech input from the human speaker and the output of the synthetic speech response simultaneously, such that the input of the speech to be made by the human speaker can be made only after the output of the entire synthetic speech response from the system has been completed, and so consequently the dialogue can be quite time consuming and inefficient especially when the system makes the erroneous recognition of the speech input.

SUMMARY OF THE INVENTION

It is therefore an object of the present invention to provide a speech dialogue system capable of carrying out the reception of the speech input from the human speaker and the output of the synthetic speech response simultaneously, such that the input of the speech can be made by the human speaker even while the output of the synthetic speech response from the system is still in progress, and so consequently the dialogue can be less time consuming and more efficient.

It is another object of the present invention to provide a speech dialogue system capable of realizing a natural communication between the system and the user of the system.

According to one aspect of the present invention there is provided a speech dialogue system, comprising: microphone means for receiving a speech input uttered by a human speaker and outputting microphone output signals; speech recognition means for recognizing the speech input received by the microphone means; synthetic speech response generation means for generating a synthetic speech response appropriate for the speech input recognized by the speech recognition means; loudspeaker means for outputting the synthetic speech response to the human speaker; and synthetic speech response cancellation means for cancelling the synthetic speech response, which is outputted from the loudspeaker means and then received by the microphone means, from the microphone output signals, to obtain input signals to be supplied to the speech recognition means from which the speech recognition means recognizes the speech input.

According to another aspect of the present invention there is provided a speech dialogue system, comprising: input means for receiving input from a user; input recognition means for recognizing the input received by the input means; response generation means for generating a response including a synthetic speech response, appropriate for the input recognized by the input recognition means; output means for outputting the response generated by the response generation means to the user; and control means for controlling a mode of an output of the response to be outputted from the output means, when there is the input from the user received by the input means.

Other features and advantages of the present invention will become apparent from the following description taken in conjunction with the accompanying drawings.

BRIEF DESCRIPTION OF THE DRAWINGS

FIGS. 24A to 24E are illustrations of various response to be determined by a dialogue management unit in the speech dialogue system of FIG. 23.

FIG. 26 is an illustration of the response output timing data to be generated at the response generation unit of FIG. 25.

FIG. 27 is an illustration of response interruption control data to be generated by an interruption control unit of the speech dialogue system of FIG. 23.

FIGS. 28 to 35 are diagrams indicating various exemplary modes of the output of the response controlled by the response interruption control data of FIG. 27.

FIG. 36 is an illustration of an evaluation of the content of the input to be made at the interruption control unit of the speech dialogue system of FIG. 23.

FIG. 37 is an illustration of an evaluation of the content of the response to be made at the interruption control unit of the speech dialogue system of FIG. 23.

DETAILED DESCRIPTION OF THE PREFERRED EMBODIMENTS

Figure 1:
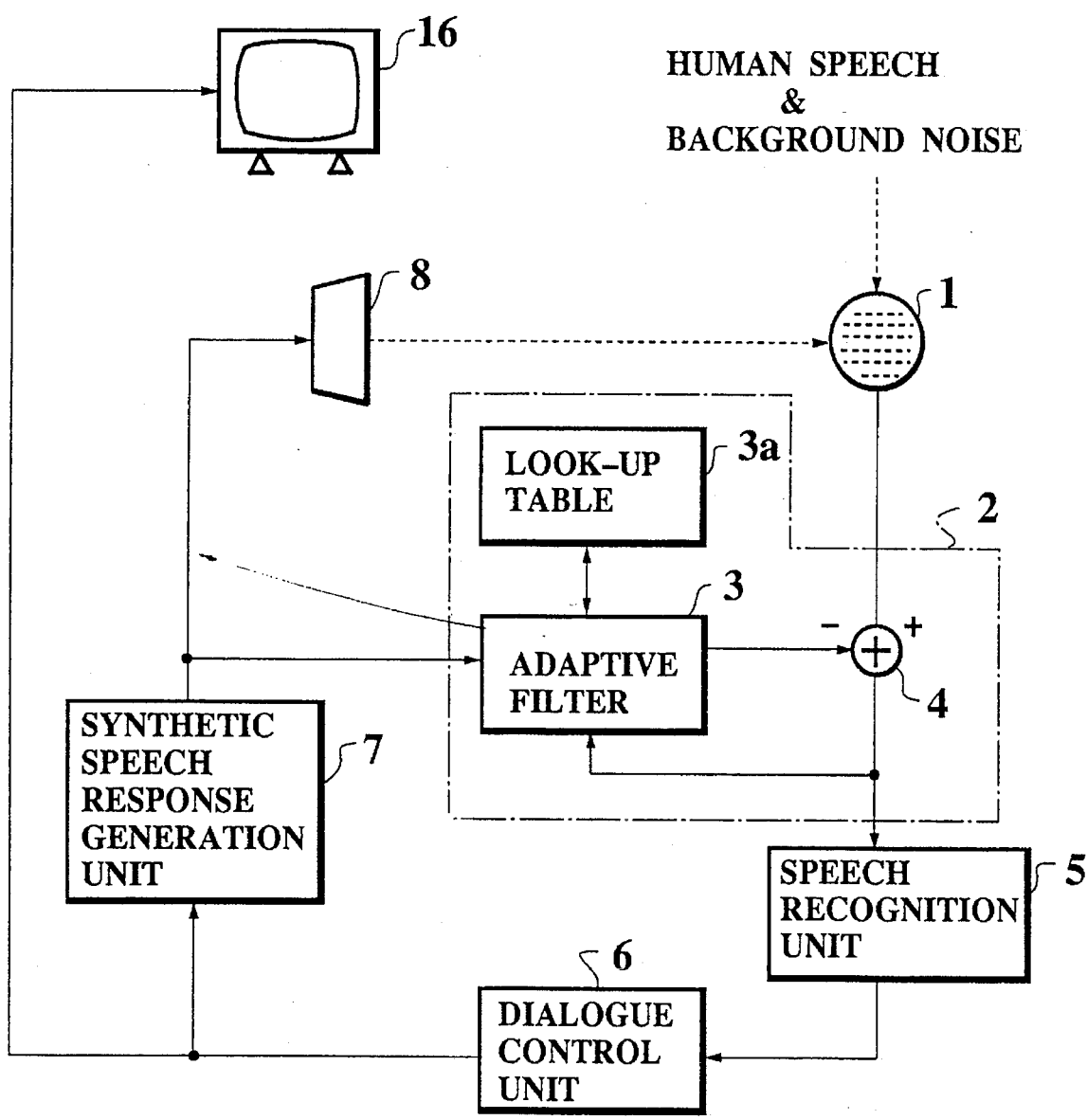
FIG. 1 is a schematic block diagram of a first embodiment of a speech dialogue system according to the present invention.

Referring now to FIG. 1, a first embodiment of a speech dialogue system according to the present invention will be described in detail.

The speech dialogue system of this first embodiment comprises: a microphone 1 for receiving a speech input from a human speaker; a loudspeaker 8 for outputting a synthetic speech response of the system in response to the speech input; a synthetic speech response cancellation unit 2 for cancelling the synthetic speech response superposed onto the speech input entered by the human speaker at the microphone 1; a speech recognition unit 5 for recognizing the content of the speech input entered by the human speaker according to the output of the synthetic speech response cancellation unit 2; a dialogue control unit 6 for selectively controlling the synthetic speech response appropriate for the content of the speech input recognized at the speech recognition unit 5; a synthetic speech response generation unit 7 for outputting the synthetic speech response selected by the dialogue control unit 6 to the loudspeaker 8 as well as to the synthetic speech response cancellation unit 2; and a display unit 16 for displaying visual data such as graphic data and image data to the human speaker.

The synthetic speech response cancellation unit 2 further comprises: a look-up table 3a for memorizing various information on the various available synthetic speech responses such as power information, pitch information, amplitude information, information on voiced and unvoiced sounds, and information on silent periods; and an adaptive filter 3 for correcting the synthetic speech response to be cancelled from the speech input entered at the microphone 1 by calculating filter coefficients W of the LMS(Least Mean Square)/Newton algorithm to be described below; and a subtractor 4 for subtracting the output of the adaptive filter 3 from the speech input entered at the microphone 1.

Here, the method of speech recognition used in the speech recognition unit 5 can be any known speech recognition method such as a word spotting method or an HMM (Hidden Markov Model) method.

Figure 2:
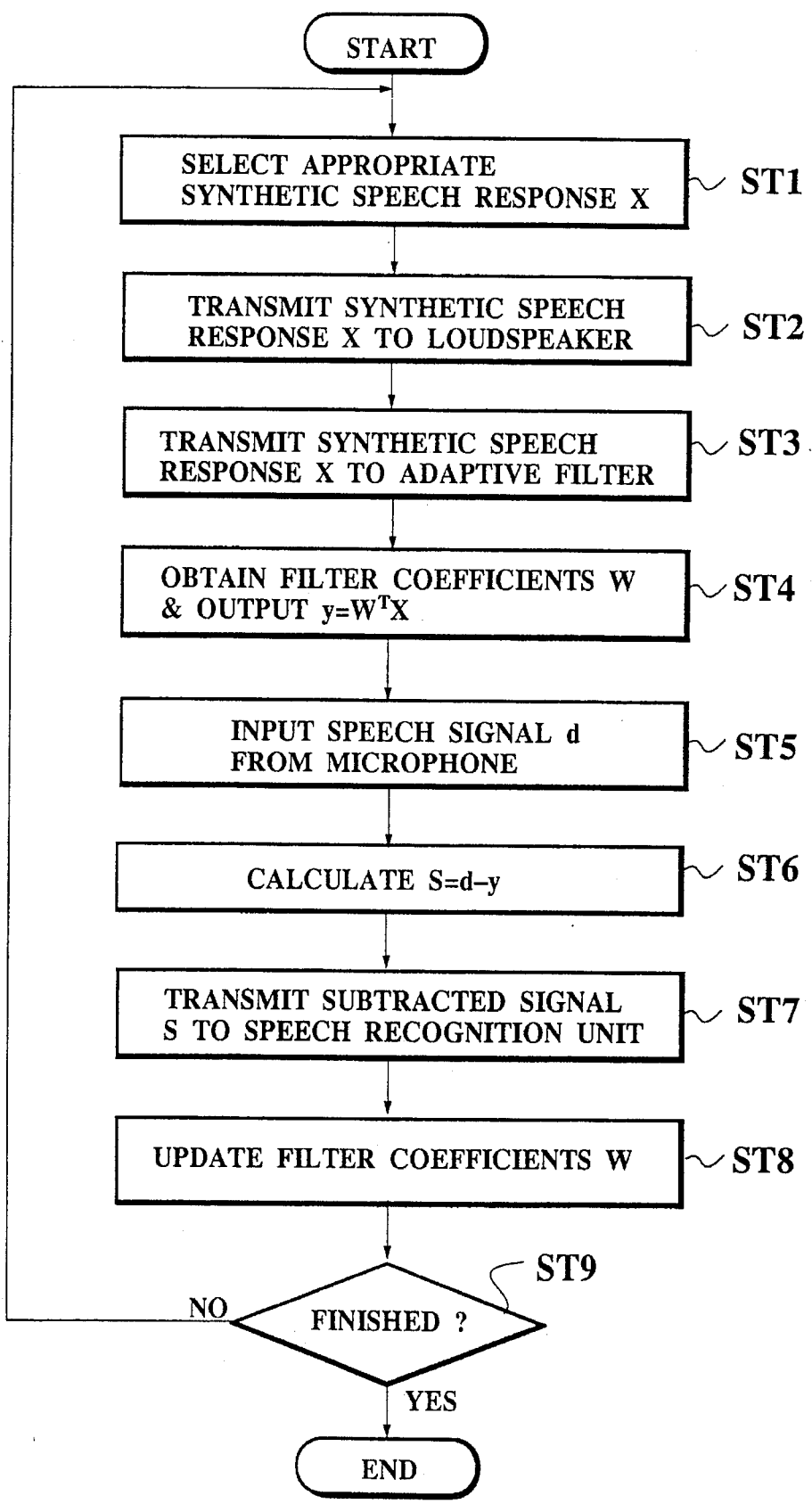
FIG. 2 is a flow chart for the operation of the speech dialogue system of FIG. 1.

This speech dialogue system of FIG. 1 operates according to the flow chart shown in FIG. 2, as follows.

First, when the human speaker enters the speech input at the microphone 1, the speech signals of the speech input are supplied to the speech recognition unit 5 through the synthetic speech response cancellation unit 2. At first, there is no synthetic speech response outputted from the synthetic speech response generation unit 7, so that the processing at the synthetic speech response cancellation unit 2 is not carried out and the speech signals obtained at the microphone 1 are directly supplied to the speech recognition unit 5.

Then, at the step ST1, the synthetic speech response appropriate for the content of the speech input recognized by the speech recognition unit S is selected by the dialogue control unit 6, and at the step ST2, the selected synthetic speech response is transmitted from the synthetic speech response generation unit 7 to the loudspeaker 8 while at the step ST3, the selected synthetic speech response is transmitted to the adaptive filter 3.

Next, at the step ST4, at the adaptive filter 3, the filter coefficients W of the LMS/Newton algorithm, which accounts for the effect on the synthetic speech response received by the microphone 1 caused by the reflection or the dissipation of the synthetic speech response outputted from the loudspeaker 8 due to the environment surrounding the system, and which is defined by the following equation (1), is calculated.

$$W_{(k+1)} = W_{(k)} + 2\mu R'_{(k)} e_{(k)} X_{(k)} \qquad (1)$$

where: k is a factor indicating an iteration number; R' is an inverse of an auto-correlation matrix of the synthetic speech response, which is to be given by the look-up table 3a; μ is a convergence factor for controlling the stability and the rate of adaptation; e is an error; and X is an input vector representing the synthetic speech response.

Then, the output signal y to be supplied to the subtractor 4 is calculated by multiplying the synthetic speech response X with the transpose of filter coefficients $W^T$ calculated according to the equation (1). In other words, the output signal y of the adaptive filter 3 is given by the following equation (2).

$$y = W^T X \qquad (2)$$

On the other hand, at the step ST5, the microphone 1 receives the speech signals d to be supplied to the subtractor 4, representing the speech input uttered by the human speaker which is superposed by the synthetic speech response outputted by the loudspeaker 8.

Then, at the step ST6, the subtractor subtracts the output signals y supplied by the adaptive filter 3 from the speech signals d supplied by the microphone 1. In other words, the subtracted signals S to be outputted from the subtractor 4 is given by the following equation (3).

$$S = d - y \qquad (3)$$

Next, at the step ST7, the subtracted signals S obtained at the subtractor 4 are supplied to the speech recognition unit 5, in order to recognize the content of the speech input uttered by the human speaker at the speech recognition unit 5, and then to select the synthetic speech response appropriate for the recognized speech input at the dialogue control unit 6, and to output the selected synthetic speech response from the synthetic speech response generation unit 7.

Then, at the step ST8, the adaptive filter 3 updates the set of filter coefficients W according to the new synthetic speech response newly outputted from the synthetic speech response generation unit 7, and by means of the step ST9, the above described process is repeated until the completion of the speech input is indicated in a predetermined manner.

Thus, according to this first embodiment, the speech input uttered by the human speaker is separated out from the speech signals received by the microphone 1 by subtracting the synthetic speech response outputted from the loud- speaker 8 appropriately modified by utilizing the LMS/Newton algorithm, so that the human speaker can make the input of the speech input at the microphone 1 even when the synthetic speech response is outputted from the loudspeaker 8.

It is to be noted that, instead of the inverse of the auto-correlation matrix R' used in the equation (1) for calculating the filter coefficients W described above, the power of the speech, indicating such information as the vocal and unvocal sounds, vowel and consonant sounds, silent periods, and sound duration, may be used. In a case of using the power p of the sound in calculating the set of filter coefficients W of the LMS/Newton algorithm, the equation (1) described above should be replaced by the following equation (4).

$$W_{(k+1)} = W_{(k)} + 2(\mu/p_{(k)} L) e_{(k)} X_{(k)} \qquad (4)$$

where L is a dimension of the speech input vector, and the factor $2(\mu/p_{(k)} L) e_{(k)}$ is the step gain. In such a case, since the characteristics of the synthetic speech response such as power information and pitch information are memorized in the look-up table 3a in advance, the set of filter coefficients W can be calculated according to the characteristics of the selected synthetic speech response accurately.

Figure 3:
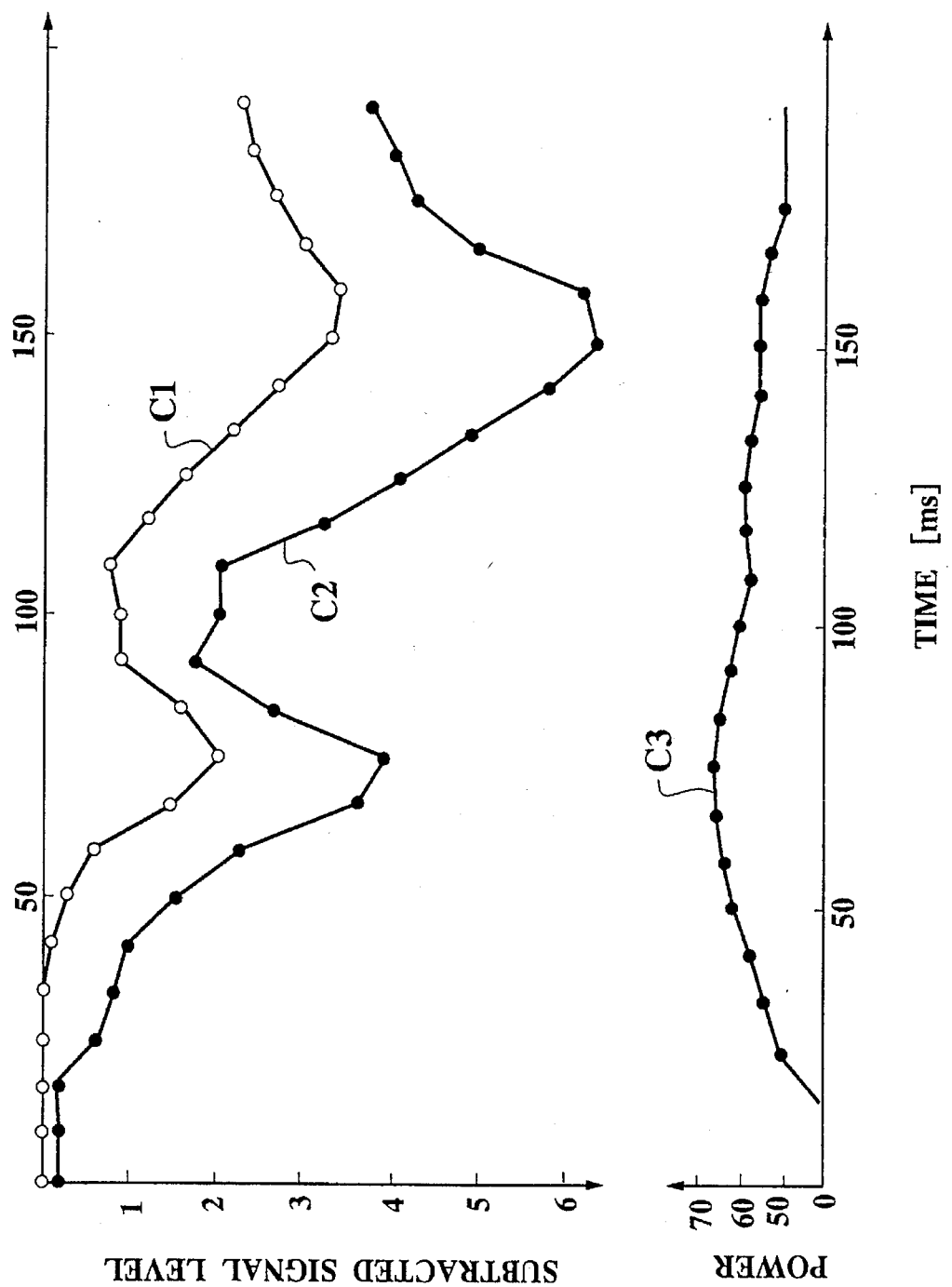
FIG. 3 is a graph of subtracted signals used in the speech dialogue system of FIG. 1 as a function of time, indicating the effect of the synthetic speech response cancellation in the speech dialogue system of FIG. 1.

FIG. 3 shows characteristics of the level of the subtracted signals S obtained at the subtractor 4, where a curve C1 represents a case in which the synthetic speech response X has a constant power level, and a curve C2 represents a case in which the synthetic speech response X has the power level characteristic indicated by a curve C3 which is memorized in the look-up table 3a. As can be seen clearly in FIG. 3, the cancellation of the synthetic speech response from the speech signals can be achieved more effectively and accurately by carrying out the LMS/Newton algorithm using the power information memorized in the look-up table 3a (a case of the curve C2).

Figure 4:
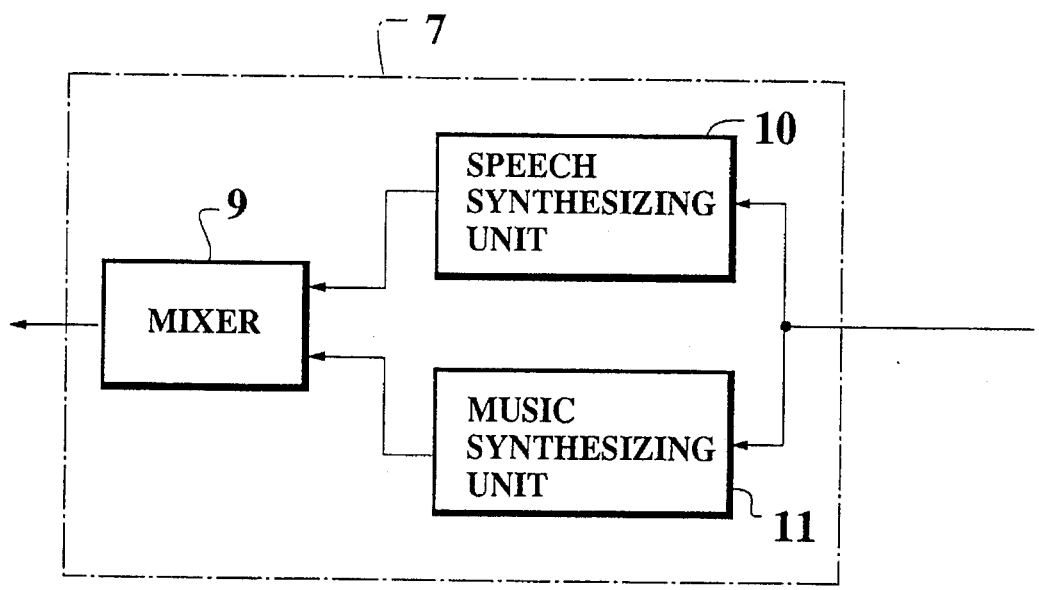
FIG. 4 is a detailed block diagram of one possible configuration for a synthetic speech response generation unit in the speech dialogue system of FIG. 1.

It is also to be noted that, in a case of outputting not only the synthetic speech response but also a music from the loudspeaker 8, the synthetic speech response generation unit 7 can be formed as shown in FIG. 4. Namely, in such a case, the synthetic speech response generation unit 7 comprises: a speech synthesizing unit 10 for outputting the synthetic speech response signals; a music synthesizing unit 11 for outputting the music signals; and a mixer 9 for mixing the synthetic speech response signals with the music signals. Here, the characteristics of the music signals can easily be obtained from the musical notes used in the music, so that by memorizing these characteristics in the look-up table 3a in advance, the music signals can be cancelled from the speech signals received at the microphone 1 in a manner similar to the cancellation of the synthetic speech response described above.

In addition, the acoustic signals other than the speech and the music including a natural sound such as a bird song and a buzzer sound may also be incorporated. The cancellation of the buzzer sound can be achieved by utilizing the fact that it is a periodical sound.

Furthermore, the cancellation of the random background noise can also be achieved in a similar manner, by utilizing the fact that the random noise is irregular but constantly present.

In a case where the signal outputted from the synthetic speech response generation unit 7 is a wide frequency band noise (white noise), it is known to be easy to estimate the set of filter coefficients W between the loudspeaker 8 and the microphone 1. Now, the vocal sound (vowel sound) in the speech signals gives the line spectrum in the short time frequency spectrum as it is the periodical signal and has a property of being not constantly present. For this reason, the spectral components for the vocal sound (vowel sound) in the speech signals are not really distributed in the wide frequency band, and this deteriorates the accuracy of the estimation of the set of filter coefficients. Here, however, by adopting a configuration shown in FIG. 4, the wide frequency band signals such as the noise or the music can be added to the portions without the frequency components in the synthetic speech response, so that it is possible to improve the accuracy of the LMS and FLMS algorithms.

Figure 5:
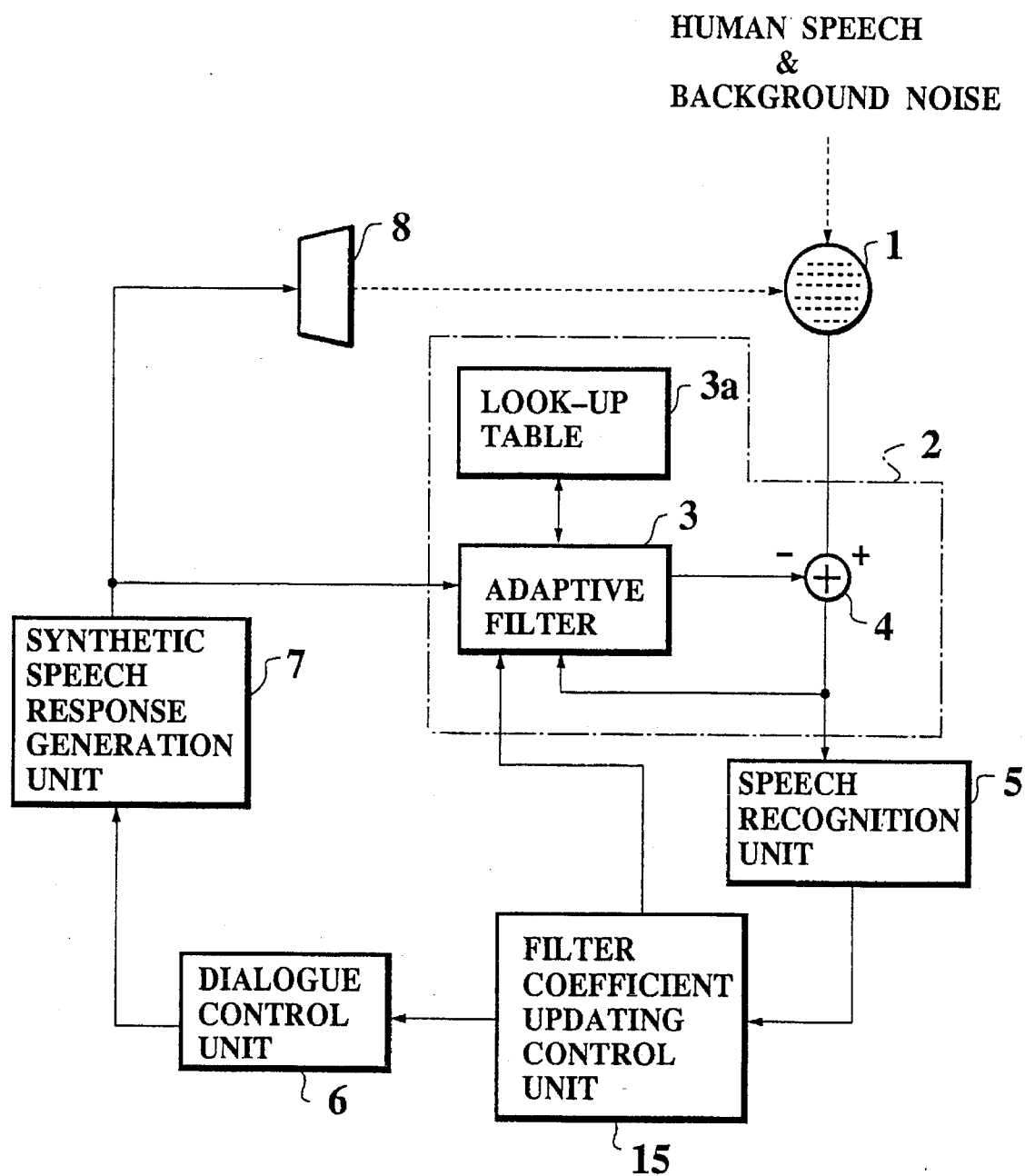
FIG. 5 is a schematic block diagram of a second embodiment of a speech dialogue system according to the present invention.

Referring now to FIG. 5, a second embodiment of a speech dialogue system according to the present invention will be described in detail. Here, those features which are substantially equivalent to the corresponding features in the first embodiment described above will be given the same reference numerals in the figure and their descriptions will be omitted.

This second embodiment differs from the first embodiment described above in that, as shown in FIG. 5, there is provided a filter coefficient updating control unit 15 between the speech recognition unit 5 and the dialogue control unit 6, which controls the updating of the filter coefficients at the adaptive filter 3. This filter coefficient updating control unit 15 functions to improve the accuracy of the estimation of the set of filter coefficients at the adaptive filter 3 at the period at which there is a speech input from the human speaker.

In this second embodiment, in estimating the filter coefficients W by using the LMS/Newton algorithm, the filter coefficients W of the past are maintained for five seconds per each 100 ms, for example. Namely, the following filter coefficients are temporarily memorized in the adaptive filter 3.

| | |
|---|---|
| $W_0$ | for the present timing |
| $W_{-1}$ | for 100 ms before the present timing |
| $W_{-2}$ | for 200 ms before the present timing |
| . | |
| . | |
| . | |
| $W_{-50}$ | for 5 sec before the present timing |

Then, when the speech input is recognized at the speech recognition unit 5, the setting of the filter coefficients W at the adaptive filter 3 is changed to the filter coefficients before the utterance of the speech input. For example, in a case the speech input has been entered by the human speaker 750 ms ago, the filter coefficients $W_0$ for the present timing are changed to the filter coefficients $W_{-8}$ for 800 ms before the present timing. The reason for the effectiveness of this change of the filter coefficient setting can be explained in conjunction with FIG. 6 as follows.

Figure 6:
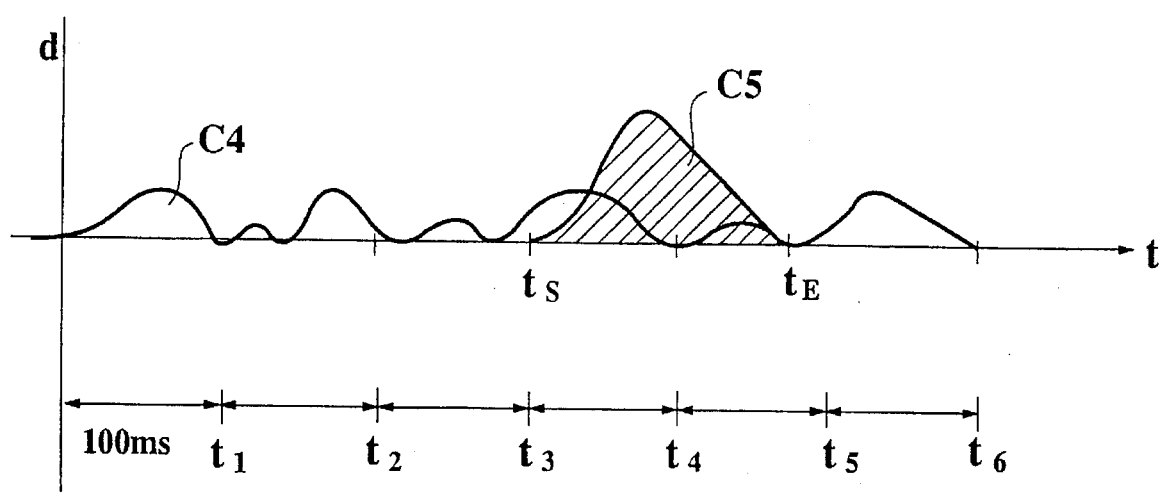
FIG. 6 is a graph of speech input as a function of time, for explaining the operation of the speech dialogue system of FIG. 5.

In FIG. 6, a curve C4 indicates the synthetic speech response signals, and a curve C5 indicates the speech input signals entered by the human speaker. In the synthetic speech response cancellation unit 2, the synthetic speech response is cancelled by updating the filter coefficients in every 100 ms, while in the speech recognition unit 5, the start point $t_s$ and an end point $t_E$ of the speech input are detected. Meanwhile, the filter coefficient updating control unit 15 makes a judgment at every 100 ms as to whether to update the present estimate $W_0$ for the filter coefficients straightforwardly or to use the past estimate $W_i$ (i=−1 to −50), according to the start point $t_s$ detected by the speech recognition unit 5. In this manner, it becomes possible in this second embodiment to obtain more accurate estimate for the set of filter coefficients W at the adaptive filter 3, even for the period at which there is a speech input from the human speaker, so that the overall efficiency of the cancellation of the synthetic speech response at the synthetic speech response cancellation unit 2 can be improved.

Now, the procedure for estimating the accurate set of filter coefficients according to some internal information such as that of time series for power and pitch utilized in synthesizing the synthetic speech response in the speech dialogue system of FIG. 5 will be described. Here, as an illustrative example, a case of a specific synthetic speech response of "torikeshimasu" (meaning "we are cancelling" in Japanese) will be described. For this specific synthetic speech response of "torikeshimasu", the power and the pitch as a function of time appear as shown in FIGS. 7A and 7B.

Figure 8:
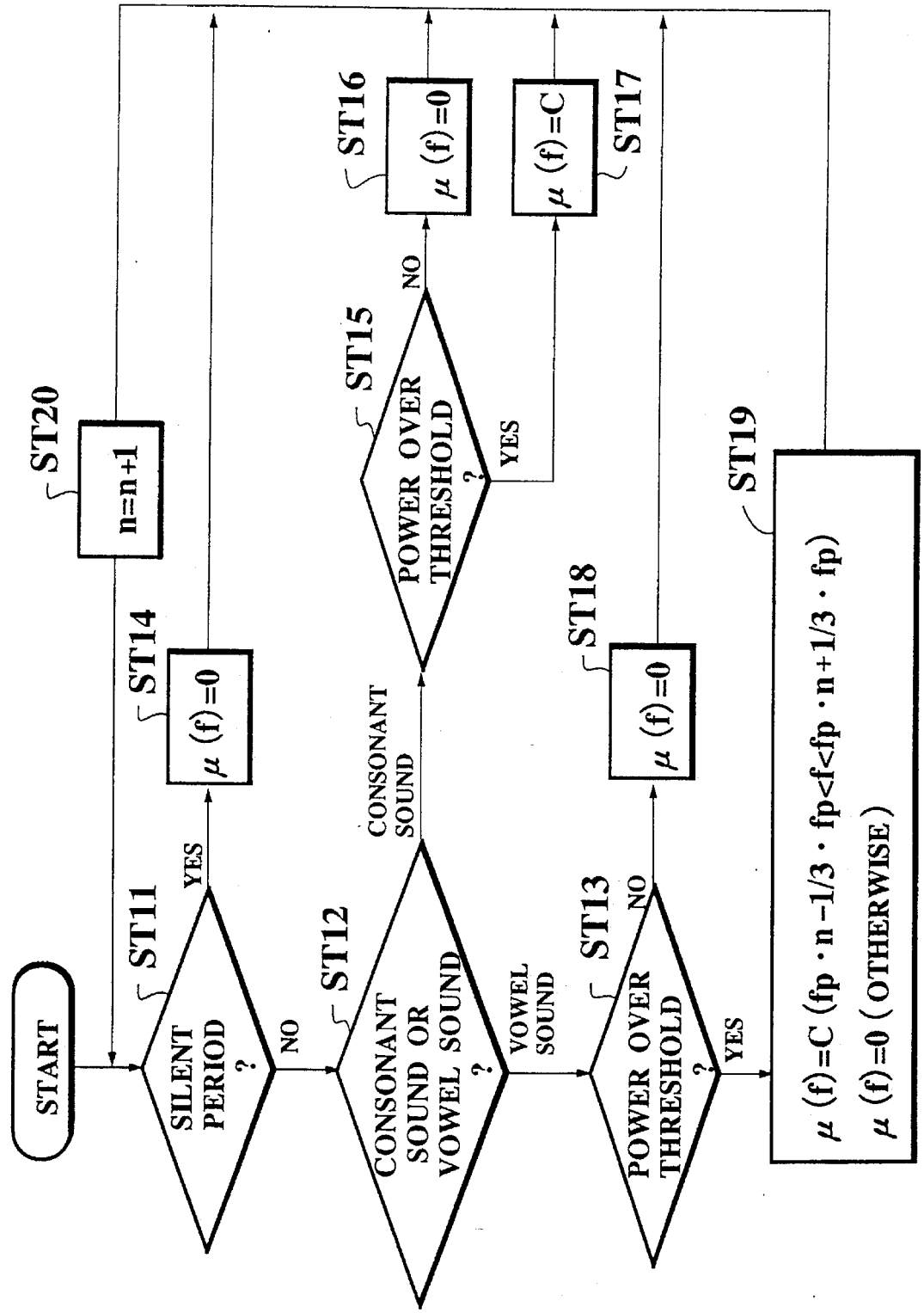
FIG. 8 is a flow chart for the procedure to obtain a step gain in FLMS algorithm used in the speech dialogue system of FIG. 5.

In the speech dialogue system of FIG. 5, the step gain for FLMS used in updating the filter coefficients is obtained according to the convergence factor determined by the flow chart of FIG. 8 as follows. Here, the FLMS estimates a transfer function which is a frequency spectrum of the filter coefficients.

Figure 7A:
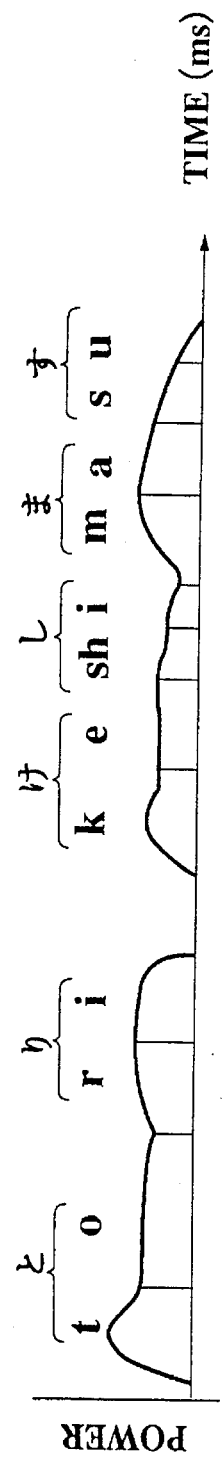
FIGS. 7A and 7B are graphs of a power and a pitch for a certain synthetic speech response as a function of time, respectively, for explaining a procedure to obtain a step gain in FLMS algorithm used in the speech dialogue system of FIG. 5.
Figure 7B:
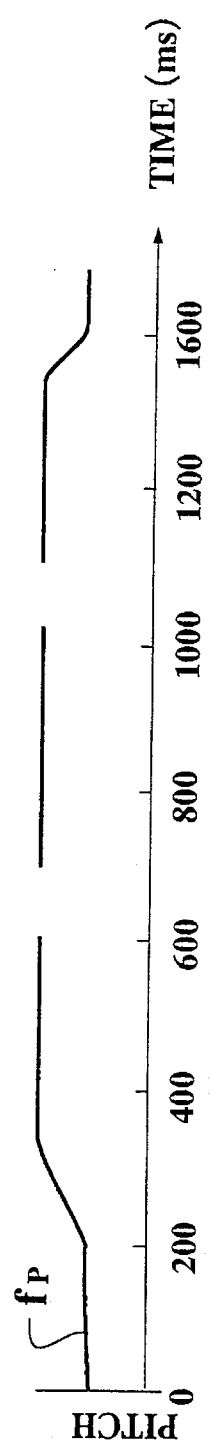

First, at the step ST11, for the first timing n=0, whether it is a silent period or not is judged from the power information shown in FIG. 7A.

In a case it is judged as a silent period at the step ST11, next at the step ST14, all of the convergence factors $\mu(f)$ for FLMS for all the frequencies are set equal to zero. By this setting, the estimate for the transfer function will be unaffected by the adaptive estimation, so that the estimate for the transfer function will be unaffected even when there is an input of a noise from the microphone 1 during the silent period.

On the other hand, in a case it is judged as not a silent period at the step ST11, next at the step ST12, whether it is a vowel sound or a consonant sound is judged. This judgement can be made easily as the phoneme is already known in advance.

In a case it is judged as a consonant sound at the step ST12, next at the step ST15, whether it is over the predetermined threshold level (such as a surrounding environmental noise level plus 20 dB) or not is judged. If it is judged to be over the threshold level at the step ST15, all of the convergence factors $\mu(f)$ for FLMS for all the frequencies are set equal to a predetermined constant convergence factor C at the step ST17, whereas otherwise all of the convergence factors $\mu(f)$ for FLMS for all the frequencies are set equal to zero at the step ST16.

On the other hand, in a case it is judged as a vowel sound at the step ST12, next at the step ST18, whether it is over the predetermined threshold level (such as a surrounding environmental noise level plus 20 dB) or not is judged. If it is judged to be not over the threshold level at the step ST13, all of the convergence factors $\mu(f)$ for FLMS for all the frequencies are set equal to zero at the step ST18. On the contrary, if it is judged to be over the threshold level at the step ST13, the convergence factors $\mu(f)$ for FLMS are set to be such that $\mu(f)=C$ for the frequencies which are in a range of $\pm(\frac{1}{3})f_p$ around the integer multiples of the pitch frequency $f_p$ at each timing indicated in FIG. 7B, and $\mu(f)=0$ for the rests which are located outside of this range. That is, $\mu(f)=C$ for $f_p \cdot n - \frac{1}{3}p_P < f < f_p \cdot n + \frac{1}{3}f_p$ $\mu(f)=0$ for otherwise where n is an integer.

This convergence factor setting procedure is then repeated for all of the timings by means of the step ST20, where the timing is updated in units of 10 ms, for example.

Thus, in this second embodiment, the updating of the estimate for the filter coefficients is carried out by placing more weights to the frequency components having larger power among the synthetic speech response.

Figure 9:
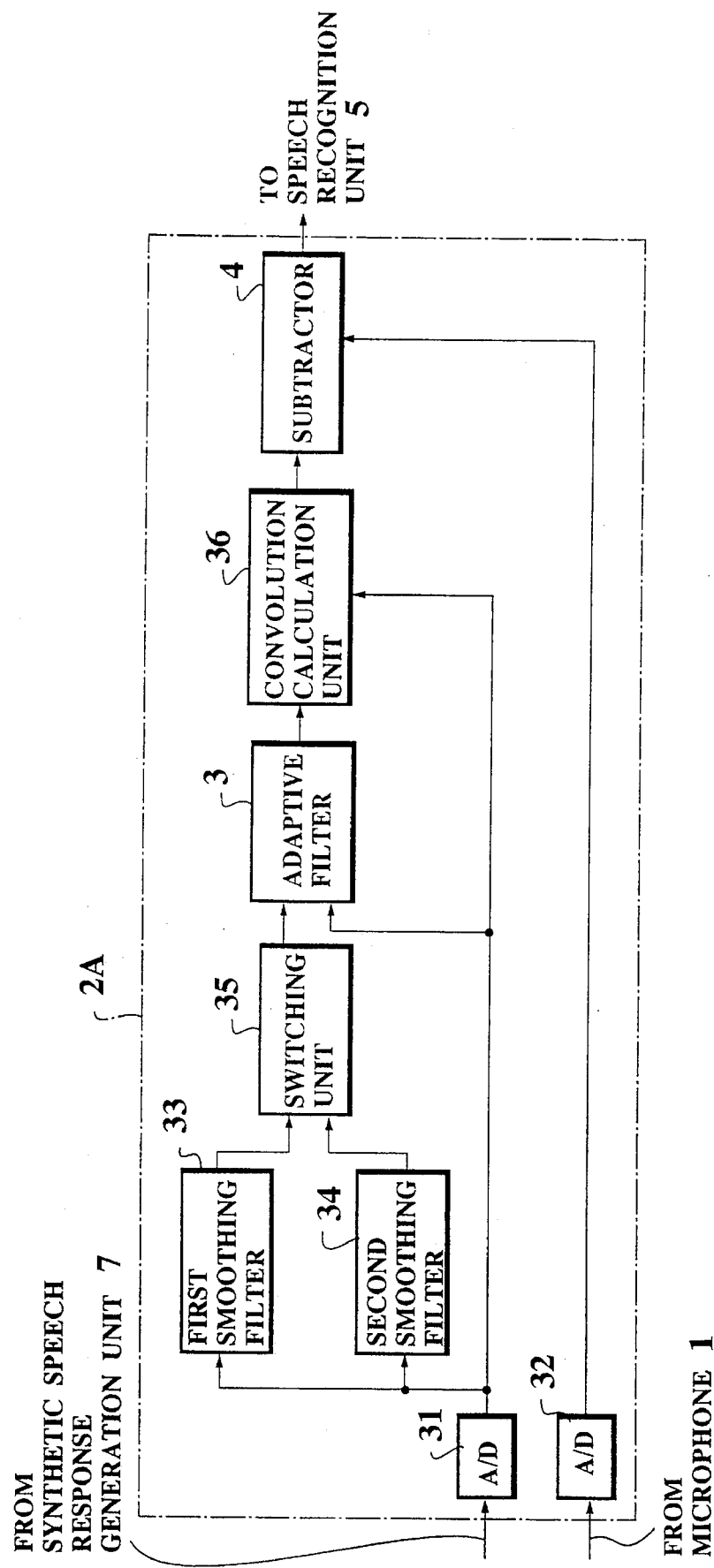
FIG. 9 is a block diagram of a synthetic speech response cancellation unit in a third embodiment of a speech dialogue system according to the present invention.

Referring now to FIG. 9, a third embodiment of a speech dialogue system according to the present invention will be described in detail.

In this third embodiment, the synthetic speech response cancellation unit 2 of the first or second embodiment described above is replaced by a configuration shown in FIG. 9, while the rest of the speech dialogue system is substantially the same as the first or second embodiment described above, in order to obtain the filter coefficients stably at a high accuracy even in a case there is a large fluctuation in the power of the speech input signals.

In this third embodiment, the synthetic speech response cancellation unit 2A comprises: an A/D converter 31 for A/D converting the synthetic speech response from the synthetic speech response generation unit 7; an A/D converter 32 for A/D converting the speech input from the microphone 1; first and second smoothing filters 33 and 34 for smoothing the A/D converted synthetic speech response power signal, using different time constants; a switching unit 35 for judging whether to carry out the adaptation by the adaptive filter 3 according to the outputs of the first and second smoothing filters 33 and 34; the adaptive filter 3 similar to that used in the first or second embodiment described above; a convolution calculation unit 36 for applying the convolution calculation to the output of the adaptive filter 3; and the subtractor 4 for subtracting the output of the convolution calculation unit 36 from the A/D converted speech input to obtain the subtracted signals.

Here, the time constant for the first smoothing filter 33 is set to be smaller than the time constant for the second smoothing filter 34, and for example, the time constant t1 for the first smoothing filter 33 is set equal to 10 ms while the time constant t2 for the second smoothing filter 34 is set equal to 100 ms.

The two channel A/D converters 31 and 32 make it possible to obtain the synthetic speech response from the synthetic speech response generation unit 7 and the speech input from the microphone 1 at the constant timings. The sampling frequency of the A/D converters 31 and 32 can be set equal to 12 KHz, in view of the frequency range used in the speech signals.

The switching unit 35 prohibits the adaptation by the adaptive filter 3 whenever the output of the first smoothing filter 33 is less than or equal to a predetermined first threshold Va, and activates the adaptation by the adaptive filter 3 whenever the output of the second smoothing filter 33 is greater than or equal to a predetermined second threshold Vb.

Figure 10A:
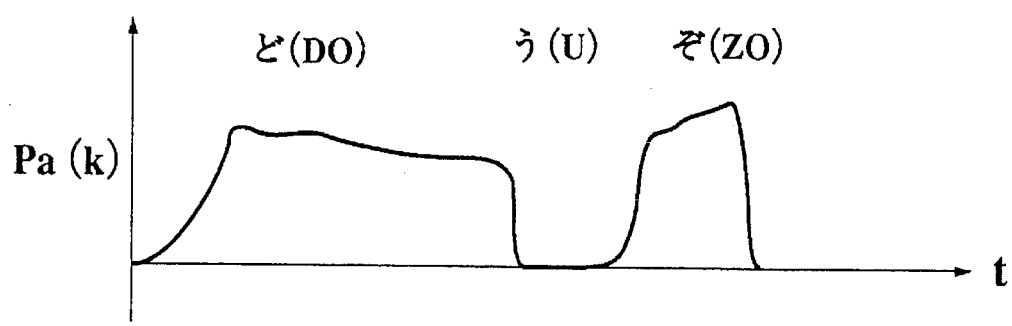
FIGS. 10A and 10B are output power of two smoothing filters in the synthetic speech response cancellation unit of FIG. 9.
Figure 10B:
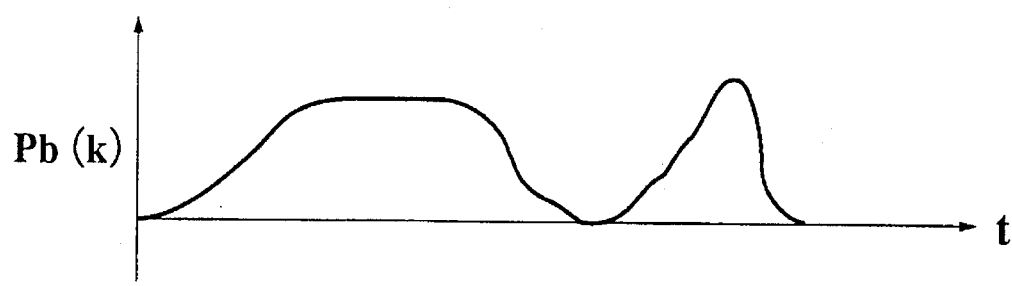

For example, for a case of a specific synthetic speech response of "douzo" (meaning "go ahead, please" in Japanese), the power for the outputs of the first and second smoothing filters 33 and 34 appear as shown in FIG. 10A and FIG. 10B, respectively, where the power Pb(k) of the output of the second smoothing filter 34 shown in FIG. 10B is smoother than the power spectrum Pa(K) of the output of the first smoothing filter 33 shown in FIG. 10A, due to the larger time constant setting for the second smoothing filter 34.

Figure 11:
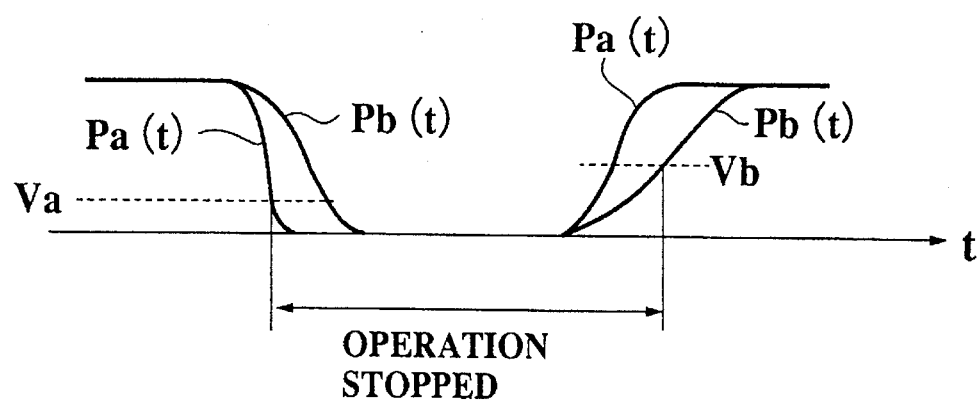
FIG. 11 is an enlarged view of central portions in the output power of FIGS. 10A and 10B, shown in superposition of one on top of the other.

The portions of the power shown in FIGS. 10A and 10B at which the sound is disrupted are shown together in enlargement in FIG. 11.

Now, in general, the accuracy of the estimate of the filter coefficients drops abruptly in a short period of time such as 1 ms when the power of the speech changes largely as in the border of the speech section and silent section. For this reason, it is possible to maintain the high accuracy for the estimate of the filter coefficients by stopping the adaptation as soon as a large change of the power of the speech occurs.

Consequently, in this third embodiment, the switching unit 35 prohibits the adaptation by the adaptive filter 3 whenever the output of the first smoothing filter 33 becomes less than or equal to a predetermined first threshold Va indicated in FIG. 11, and activates the adaptation by the adaptive filter 3 whenever the output of the second smoothing filter 33 becomes greater than or equal to a predetermined second threshold Vb indicated in FIG. 11, such that the adaptation by the adaptive filter 3 is not carried out when the power of the speech changed largely.

Here, the appropriate values for the first and second thresholds Va and Vb are empirically determined, and for example, the value of the first threshold Va can be set equal to −20 dB which is a mean power of the synthetic speech response.

Figure 12:
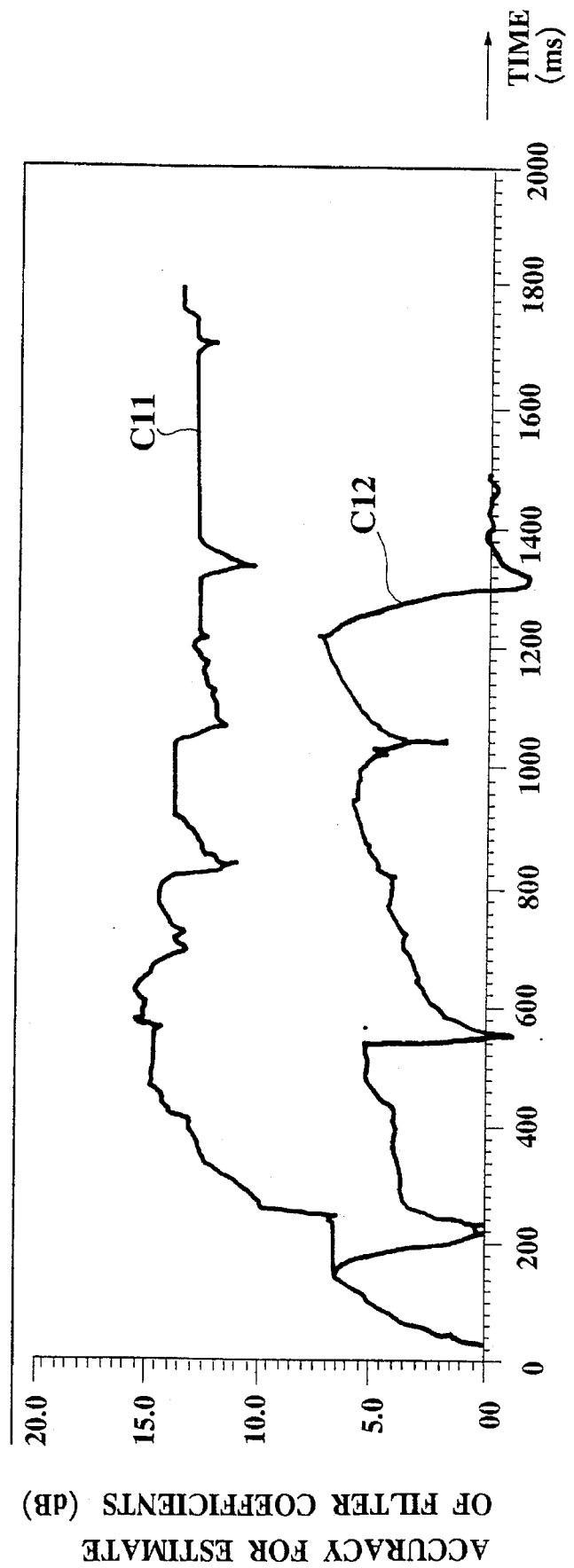
FIG. 12 is a graph of an accuracy for estimate of filter coefficients as a function of time, indicating the effect of the synthetic speech response cancellation unit of FIG. 9.

In order to demonstrate the effect of this third embodiment, the accuracy for the estimate of the filter coefficients for a case of using a specific synthetic speech response of "irasshaimase" (meaning "welcome" in Japanese) is shown in FIG. 12, where a curve C11 indicates a case with the stopping of the adaptation as described above, while a curve C12 indicates a case without the stopping of the adaptation. As can be clearly seen in FIG. 12, the estimate of the filter coefficients can be obtained at much higher accuracy with the stopping of the adaptation.

Figure 13:
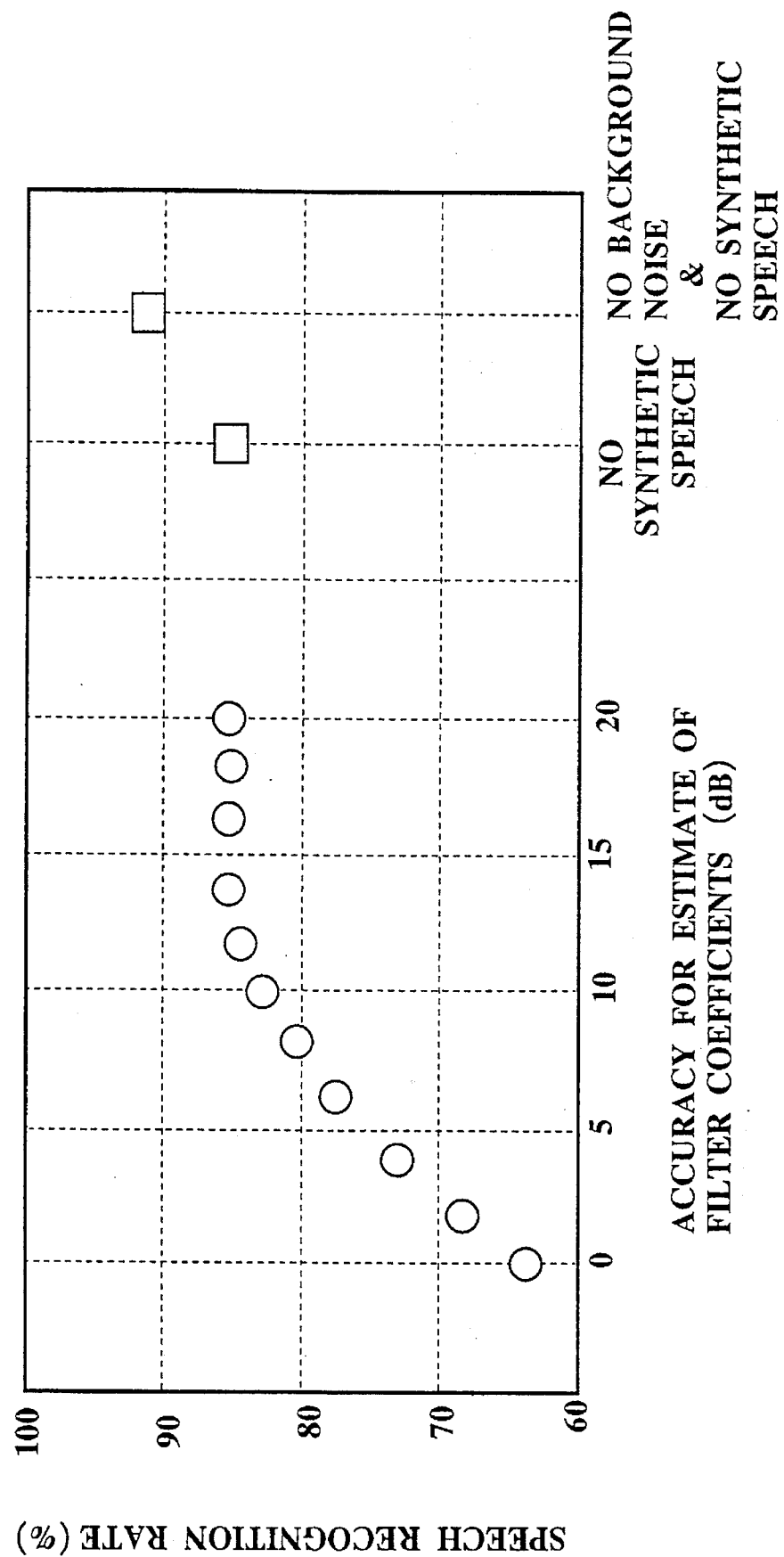
FIG. 13 is a graph of a speech recognition rate versus an accuracy for estimate of filter coefficients, indicating the effect of the synthetic speech response cancellation unit of FIG. 9.

In addition, the speech recognition rate as a function of the accuracy of the estimate for the filter coefficients is shown in FIG. 13, which clearly indicates that the speech recognition rate becomes higher for the higher accuracy of the estimate for the filter coefficients, i.e., for the larger amount of cancellation of the synthetic speech response.

Thus, according to this third embodiment, the high accuracy for the estimate of the filter coefficients can be achieved by stopping the adaptation by the adaptive filter whenever there is a large change in the power of the speech, and this high accuracy for the estimate of the filter coefficients in turn ensures the high speech recognition rate, so that it becomes possible in this third embodiment to carry out the cancellation of the synthetic speech response more effectively.

Figure 14:
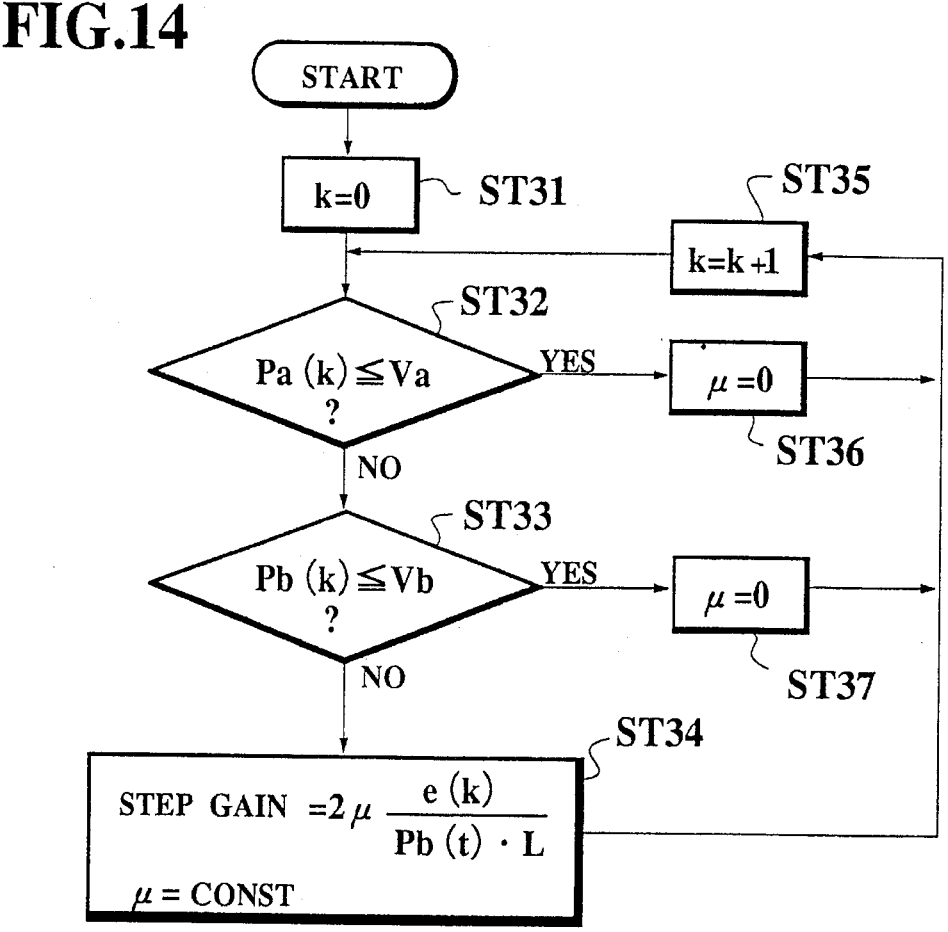
FIG. 14 is a flow chart for the procedure to obtain a step gain in LMS algorithm used in the synthetic speech response cancellation unit of FIG. 9.

In the speech dialogue system of this third embodiment, the step gain for LMS used in updating the filter coefficients is obtained according to the flow chart of FIG. 14 as follows.

First, the initial timing is set to k=0 at the step ST31, and for the first timing k=0, whether the output power Pa(k) of the first smoothing filter 88 is not greater than the first threshold Va is judged at the step ST32.

In a case it is judged as not greater than the first threshold Va at the step ST32, next at the step ST36, the step gain for LMS is set equal to zero by setting the convergence factor μ=0, so as to prohibit the updating of the filter coefficients.

On the other hand, in a case it is judged as greater than the first threshold Va at the step ST32, next at the step ST33, whether the output power Pb(k) of the second smoothing filter 34 is not greater than the second threshold Vb is judged.

In a case it is judged as not greater than the second threshold Vb at the step ST33, next at the step ST37, the step gain for LMS is set equal to zero by setting the convergence factor μ=0, so as to prohibit the updating of the filter coefficients.

On the other hand, in a case it is judged as greater than the second threshold Vb at the step ST32, next at the step ST34, the step gain for LMS is set according to the following equation (5), so as to carry out the updating of the filter coefficients.

step gain=$2\mu \cdot e(k)/(Pb(t) \cdot L)$ (5)

where the convergence factor $\mu$ is a constant.

This step gain setting procedure is then repeated for all of the timings by means of the step ST35.

It is to be noted that the amount of calculation required in estimating the filter coefficients can be quite large, so that in order to carry out such a large amount of calculation in real time fashion, a DSP board may be used in the synthetic speech response cancellation unit 2A.

It is also to be noted that the synthetic speech response cancellation unit 2A of FIG. 9 may be modified to have a different number of the smoothing filters such as one or three, instead of two as described above.

Figure 15:
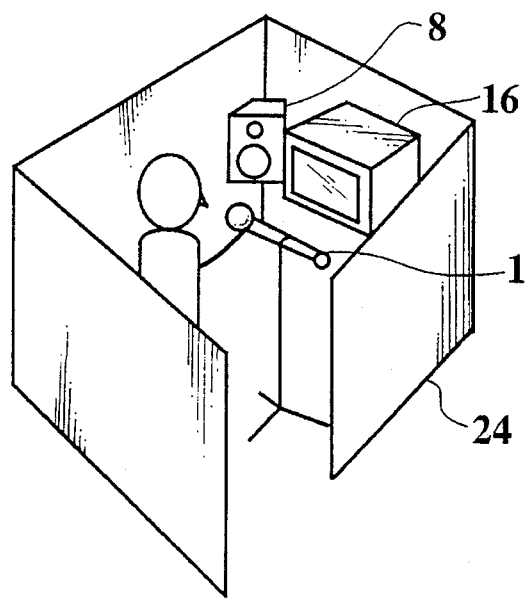
FIG. 15 is a perspective view of an external configuration of the speech dialogue system according to the present invention.

The speech dialogue system according to the present invention has an outer appearance as shown in FIG. 15. The user utters the input speech toward the microphone 8 while viewing the visual information displayed on the display unit 16, and the synthetic speech response from the system is outputted from the loudspeaker 8.

Here, the microphone 1 can be a directional microphone so as not to pick up the synthetic speech response outputted from the loud speaker 8 as much as possible. However, the use of the directional microphone alone is insufficient to cancel the synthetic speech response from the speech input at the microphone 1 because of the presence of the reverberation due to the surrounding walls 24. In this respect, according to the present invention, the synthetic speech response is cancelled out from the speech input at the microphone 1 by the function of the synthetic speech response cancellation unit 2, so that the user can make the input of the speech by interrupting the output of the synthetic speech response from the loudspeaker 8.

Also, in order to improve the S/N ratio of the speech input at the microphone 1, it is preferable for the user to utter the input speech at a position sufficiently close to the microphone 1 such as a position within a range of 30 cm from the microphone 1, but this close position of the user with respect to the microphone 1 in turn causes the reflection of the synthetic speech response outputted from the loudspeaker 8 by the body of the user toward the microphone 1. The synthetic speech response picked up by the microphone 1 due to such a reflection off the body of the user is troublesome as it has relatively large level and as its amplitude and time delay can fluctuate according to the movement of the body of the user. In this respect, according to the present invention, the filter coefficients are constantly updated at the adaptive filter 3, so that the effective cancellation of the synthetic speech response from the speech input at the microphone 1 becomes possible.

Thus, according to the present invention, it becomes possible to provide a speech dialogue system capable of carrying out the reception of the speech input from the human speaker and the output of the synthetic speech response simultaneously, such that the input of the speech can be made by the human speaker even while the output of the synthetic speech response from the system is still in progress, and so consequently the dialogue can be less time consuming and more efficient.

Figure 16:
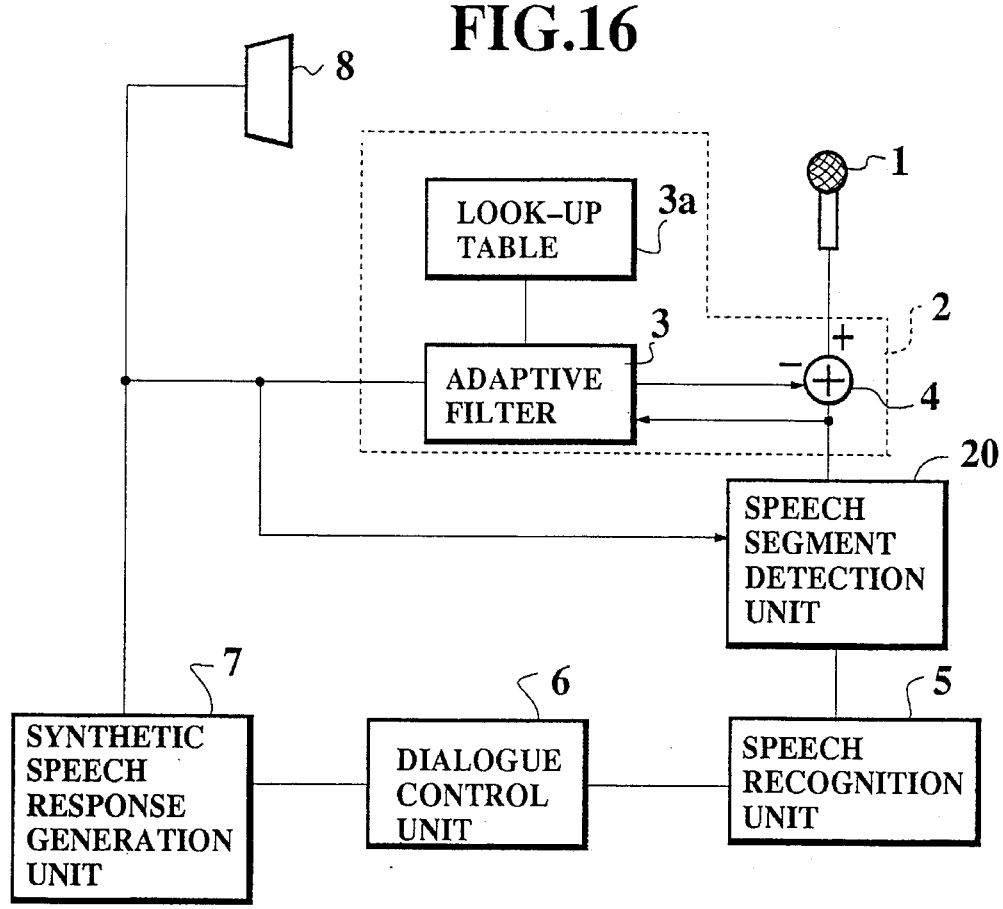
FIG. 16 is a schematic block diagram of a fourth embodiment of a speech dialogue system according to the present invention.

Referring now to FIG. 16, a fourth embodiment of a speech dialogue system according to the present invention will be described in detail. Here, those features which are substantially equivalent to the corresponding features in the first embodiment described above will be given the same reference numerals in the figure and their descriptions will be omitted.

This fourth embodiment differs from the first embodiment described above in that, as shown in FIG. 16, there is provided a speech segment detection unit 20 between the subtractor 4 and the speech recognition unit 5, which functions to prevent the erroneous speech recognition by the speech recognition unit 5 due to the increased signal power level caused by the synthetic speech response mixed into the speech input at the microphone 1.

Figure 17:
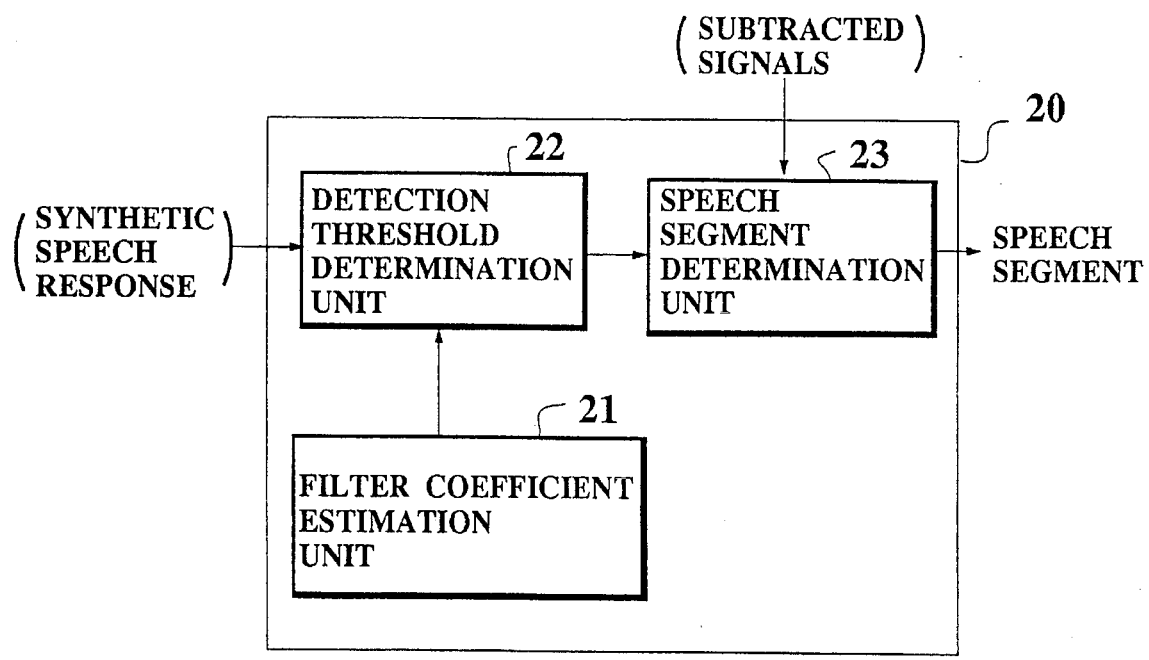
FIG. 17 is a detailed block diagram of a speech segment detection unit in the speech dialogue system of FIG. 16.

In this fourth embodiment, the speech segment detection unit 20 has a configuration shown in FIG. 17, which comprises: a filter coefficient estimation unit 21 for estimating the filter coefficients between the microphone 1 and the loudspeaker 8; a detection threshold determination unit 21 for determining a detection threshold to be used in carrying out a speech segment detection, according to the power of the synthetic speech response and the filter coefficients estimated by the filter coefficient estimation unit 21; and a speech segment determination unit 22 for determining a speech segment in the subtracted signals outputted from the subtractor 4 by using the detection threshold determined by the detection threshold determination unit 21.

Now, the speech segment detection to be carried out by this speech segment detection unit 20 in this fourth embodiment will be described in detail.

Figure 18:
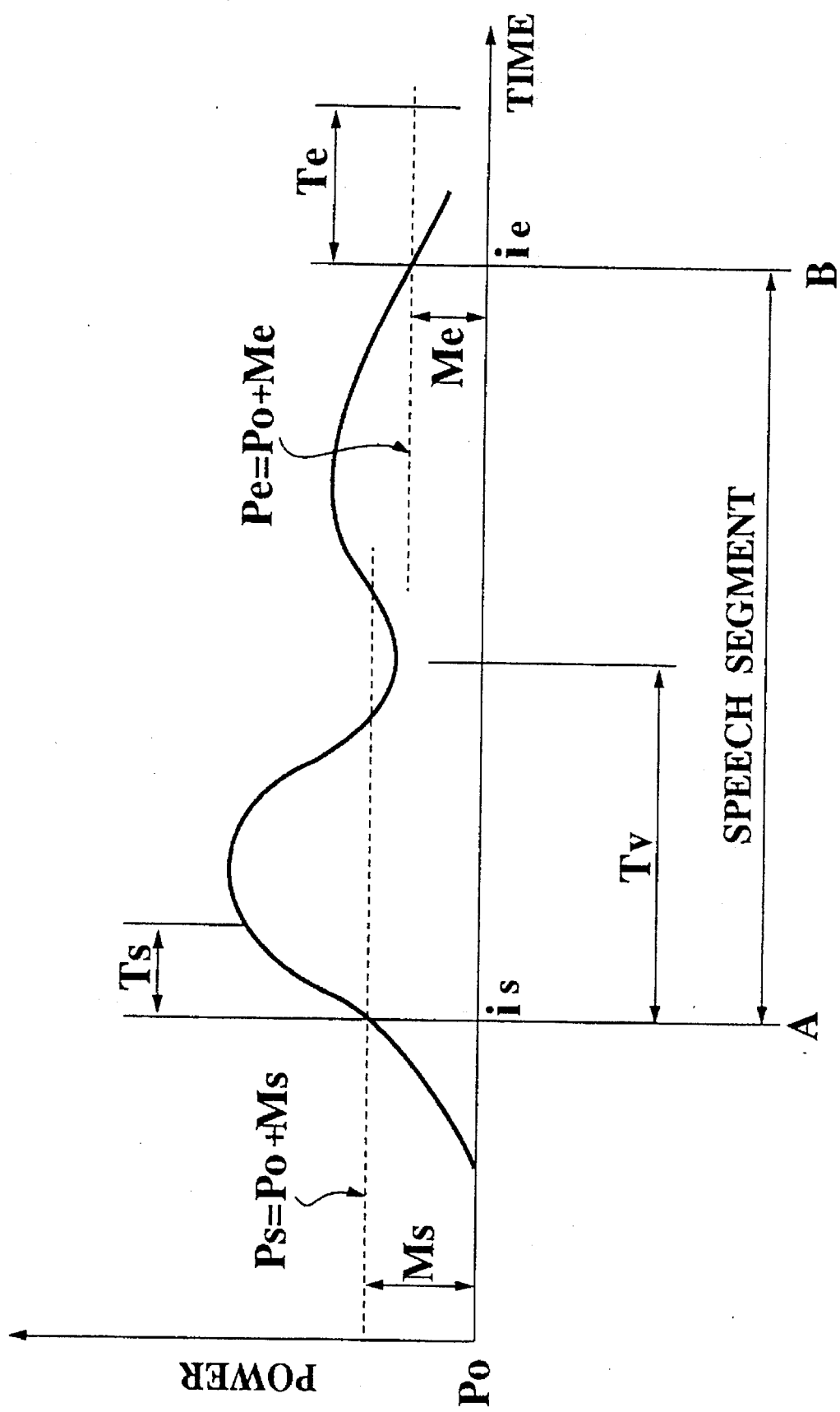
FIG. 18 is a power of an exemplary speech input, for explaining the speech segment detection by the speech detection unit of FIG. 17.

FIG. 18 shows a power of an exemplary speech input. In this fourth embodiment, the speech segment is detected to be a segment between a starting point A and an ending point B. Here, a background noise power level Po is measured in advance, a starting point detection threshold Ps is defined as the background noise power level Po plus a starting point determining margin Ms, where the starting point determining margin Ms has a predetermined value such as 5 dB, for example, and an ending point detection threshold Pe is defined as the background noise power level Po plus an ending point determining margin Me, where the ending point determining margin Me has a predetermined value such as 3 dB, for example. In addition, a starting point determining speech duration Ts is defined to have a value such as 20 ms, for example, an ending point determining silence duration Te is defined to have a value such as 200 ms, for example, and a minimum speech duration Tv is defined to have a value such as 200 ms, for example.

Figure 19:
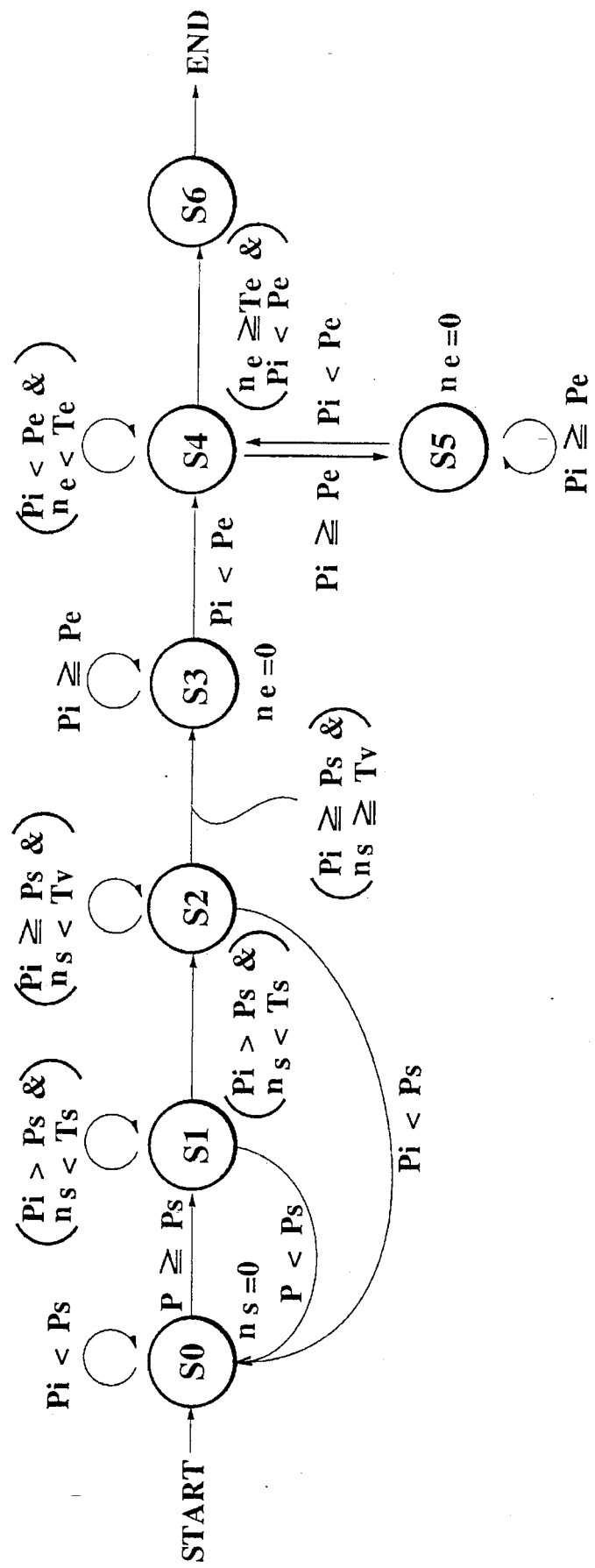
FIG. 19 is a state transition diagram for explaining the speech segment detection by the speech detection unit of FIG. 17.

In this fourth embodiment, the speech segment detection can be carried out by obtaining the input signal power level at constant interval such as 10 ms, and comparing the obtained input signal power level with the starting point detection threshold Ps and the ending point detection threshold Pe, while following the transitions among various states indicated in a state transition diagram shown in FIG. 19.

In the state transition diagram of FIG. 19, each arrow indicates a transition between the states, and inequalities accompanying each arrow indicate conditions for the transition, where a time measured from the starting point A is denoted as $n_s$ while a time measured from the ending point B is denoted as $n_e$, and the input signal power level at a time i is denoted as Pi. In this case, there are six states including: a state S0 having no speech input; a state S1 in which the starting point is provisionally determined; a state S2 in which the starting point is established; a state S3 in which the input is established as the speech; a state S4 in which the ending point is provisionally determined; a state S5 in which the speech is continuing; and a state S6 in which the ending point is established and the speech segment detection is completed.

First, when there is no speech input, it is in the state S0, and when the input signal power level Pi rises above the starting point detection threshold Ps at a time $i_s$, this time $i_s$ is provisionally determined as the starting point A, so as to make a transition to the state S1. Otherwise, it remains in the state S0.

Next, while in the state S1, the time $n_s$ is measured from the time $i_s$, and when the time $n_s$ exceeds the starting point determining speech duration Ts, the time $i_s$ is established as the starting point, so as to make a transition to the state S2. On the other hand, when the input signal power level Pi falls below the starting point detection threshold Ps, a transition is made to the state S0. Otherwise, it remains in the state S1.

Next, while in the state S2, when the time $n_s$ exceeds the minimum speech duration Tv while the input signal power level Pi remains to be over the starting point detection threshold Ps, the input signals are established as the speech, so as to make a transition to the state S3. On the other hand, when the input signal power level Pi falls below the starting point detection threshold Ps before the time $n_s$ reaches to the minimum speech duration Tv, a transition is made to the state S0. Otherwise, it remains in the state S2.

Next, while in the state S3, when the input signal power level Pi falls below the ending point detection threshold Pe at a time $i_e$, this time $i_e$ is provisionally determined as the ending point B, so as to make a transition to the state S4. Otherwise, it remains in the state S3.

Next, while in the state S4, the time $n_e$ is measured from the time $i_e$, and when the time $n_e$ exceeds the ending point determining silence duration Te while the input signal power level Pi remains to be below the ending point detection threshold Pe, the time $i_e$ is established as the ending point B, so as to make a transition to the state S6, in which case the speech segment detection is completed. On the other hand, when the input signal power level Pi rises above the ending point detection threshold Pe before the time $n_e$ reaches to the ending point determining silence duration Te, a transition is made to the state S5. Otherwise, it remains in the state S4.

Next, while in the state S5, when the input signal power level Pi falls below the ending point detection threshold Pe at a time $i_e'$, this time $i_e'$ is provisionally determined as the ending point B, so as to make a transition to the state S4. Otherwise, it remains in the state S5.

Figure 20:
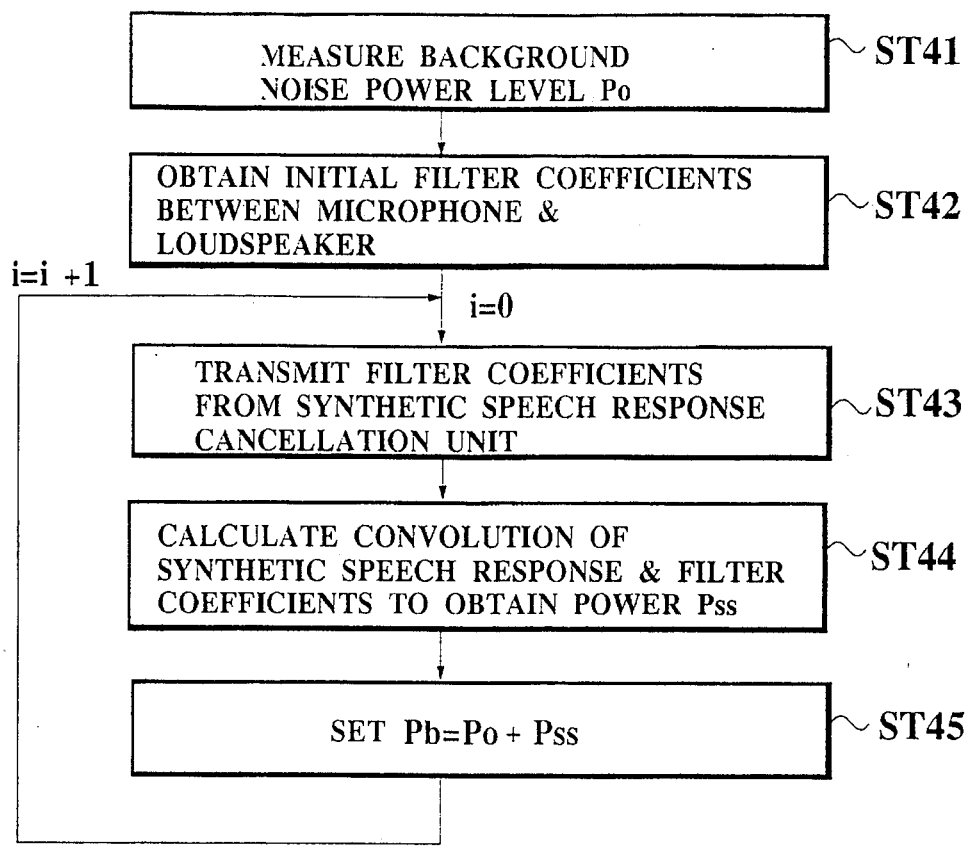
FIG. 20 is a flow chart for the operation of the speech segment detection by the speech detection unit of FIG. 17.

Now, in a case the synthetic speech response is mixed into the speech input at the microphone 1, the input signal power level is raised as much as a contribution due to the synthetic speech response, so that in order to prevent the erroneous speech recognition, it is necessary to raise the detection threshold as much as the contribution due to the synthetic speech response. Here, if the detection threshold is raised by a large value for the safety reason considering the case of the high level synthetic speech response, and made to be a constant, the speech segment detection performance would be deteriorated for a case without the synthetic speech response. For this reason, in order to maintain the high speech segment detection performance, it is preferable to control the setting of the detection threshold regularly, according to the synthetic speech response power level, to be the optimum setting. This is done in this fourth embodiment at the detection threshold determination unit 22 and the filter coefficient estimation unit 21, according to the flow chart of FIG. 20, as follows.

First, at the step ST41, the background noise power level Po is measured in a state S0 without the speech input, and then at the step ST42, the initial filter coefficients between the microphone 1 and the loudspeaker 8 is estimated while outputting the predetermined synthetic speech response from the loudspeaker 8 for a predetermined period of time such as 3 sec.

Here, it is to be noted that the estimation of the filter coefficients is also made at the synthetic speech response cancellation unit 2, so that instead of providing the filter coefficient estimation unit 21 in the speech segment detection unit 20, the estimate for the filter coefficients may be supplied to the speech segment detection unit 20 from the synthetic speech response cancellation unit 2. In such a case, an optional step of the step ST43 should be taken next, at which the estimate for the filter coefficients is transmitted from the synthetic speech response cancellation unit 2 to the speech segment detection unit 20.

Next, at the step ST44, the convolution of the estimated filter coefficients and the synthetic speech response is calculated to obtain the synthetic speech component and its power level Pss.

Then, at the step ST45, the base power level Pb for the speech segment detection is set to be the sum of the synthetic speech component power level Pss obtained at the step ST44 and the background noise power level Po obtained at the step ST41. For the subsequent timings, the above described steps ST43 to ST45 are repeated at a constant interval such as 10 ms, for example, so as to reduce the amount of power calculation, and the new filter coefficients newly estimated at the synthetic speech response cancellation unit 2 at each timing is used, so as to account for the change of the acoustic condition.

Here, because of the function of the synthetic speech response cancellation unit 2, the synthetic speech response is cancelled from the speech input at the microphone 1, so that in principle the synthetic speech component power level Pss may be set to be much smaller value. However, in a case the acoustic condition is changing, the estimate for the filter coefficients may not necessarily be able to keep up with the change of the acoustic condition completely, in which case the cancellation of the synthetic speech response may not necessarily be complete, so that it is practically safer to use the synthetic speech component power level Pss as it is.

It is to be noted here that the estimate for the filter coefficients can be improved as follows.

Namely, the speech signals inputted into the adaptive filter 3 have a non-flat frequency spectrum, and this non-flatness of the frequency spectrum lowers the convergence speed for the LMS algorithm in the adaptive filter 3. To cope with this problem, it is possible to achieve the highly accurate estimation of the filter coefficients by raising the S/N ratio over the entire frequencies by adding the wide frequency band noise to the synthetic speech response. Here, by changing the noise power level according to the synthetic speech response power level, it becomes possible not to give an excessively noisy impression to the human speaker. In particular, in the state without the speech input, the noise amplitude should preferably be set equal to zero. Also, the wide frequency band noise to be added may be the recording of the environmental noise at a cite of the speech dialogue system, or other familiar noise such as noise of a crowd at a station or noise in computer room, so as not to give an excessively noisy impression to the human speaker even when the noise is outputted continuously at a constant level.

In addition, the lowering of the convergence speed in the adaptive filter 3 due to the non-flat frequency spectrum of the speech signals can be suppressed by the spectral pre-whitening of the input signals in a conventionally known manner. In such a spectral pre-whitening, the inverted filter is usually employed, but the correction of the power spectrum biased toward the lower frequency components can also be achieved by taking the first order differenced signals of the input signals. Such a differencing calculation process is a very simple process requiring only a small amount of calculation, so that it is convenient for the real time implementation.

Figure 21:
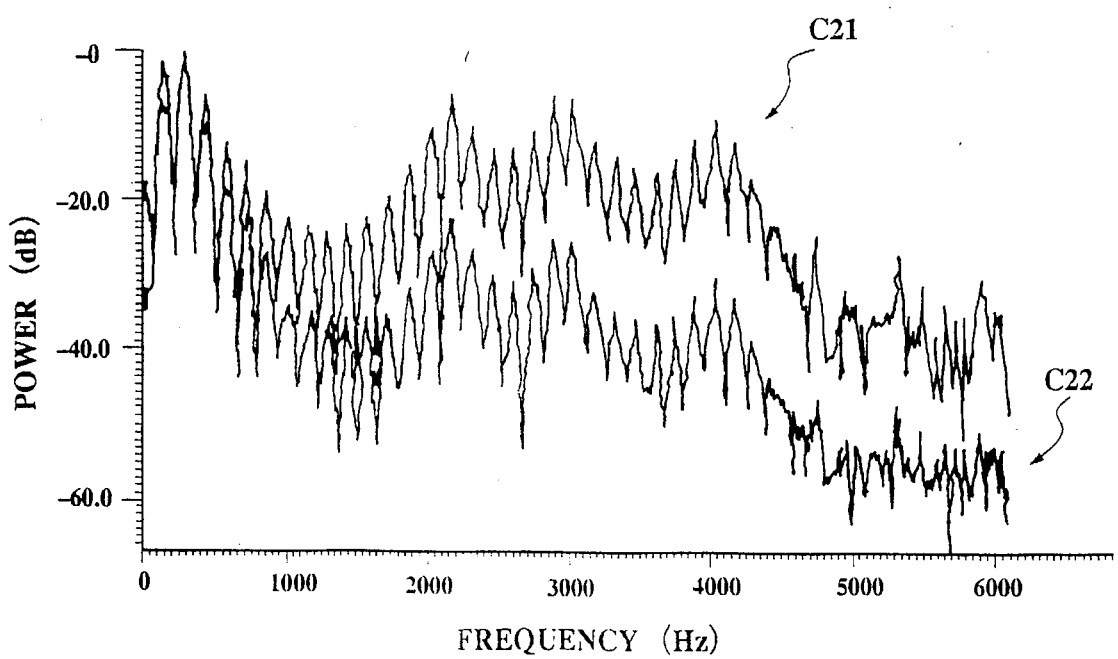
FIG. 21 is a frequency spectrum of a specific synthetic speech response, indicating the effect of the use of the spectral pre-whitening of the frequency spectrum.

To demonstrate the effect of such a difference calculation process, FIG. 21 shows a frequency spectrum of a phoneme "i" in the synthetic speech response of "irasshaimase", where a curve C21 indicates the spectrum after the difference calculation process while a curve C22 indicates the original spectrum. It can be clearly seen in FIG. 21 that the spectrum has been flattened by the application of the difference calculation process, as the power at the middle to higher frequency components are brought up to the level of the lower frequency components.

Figure 22:
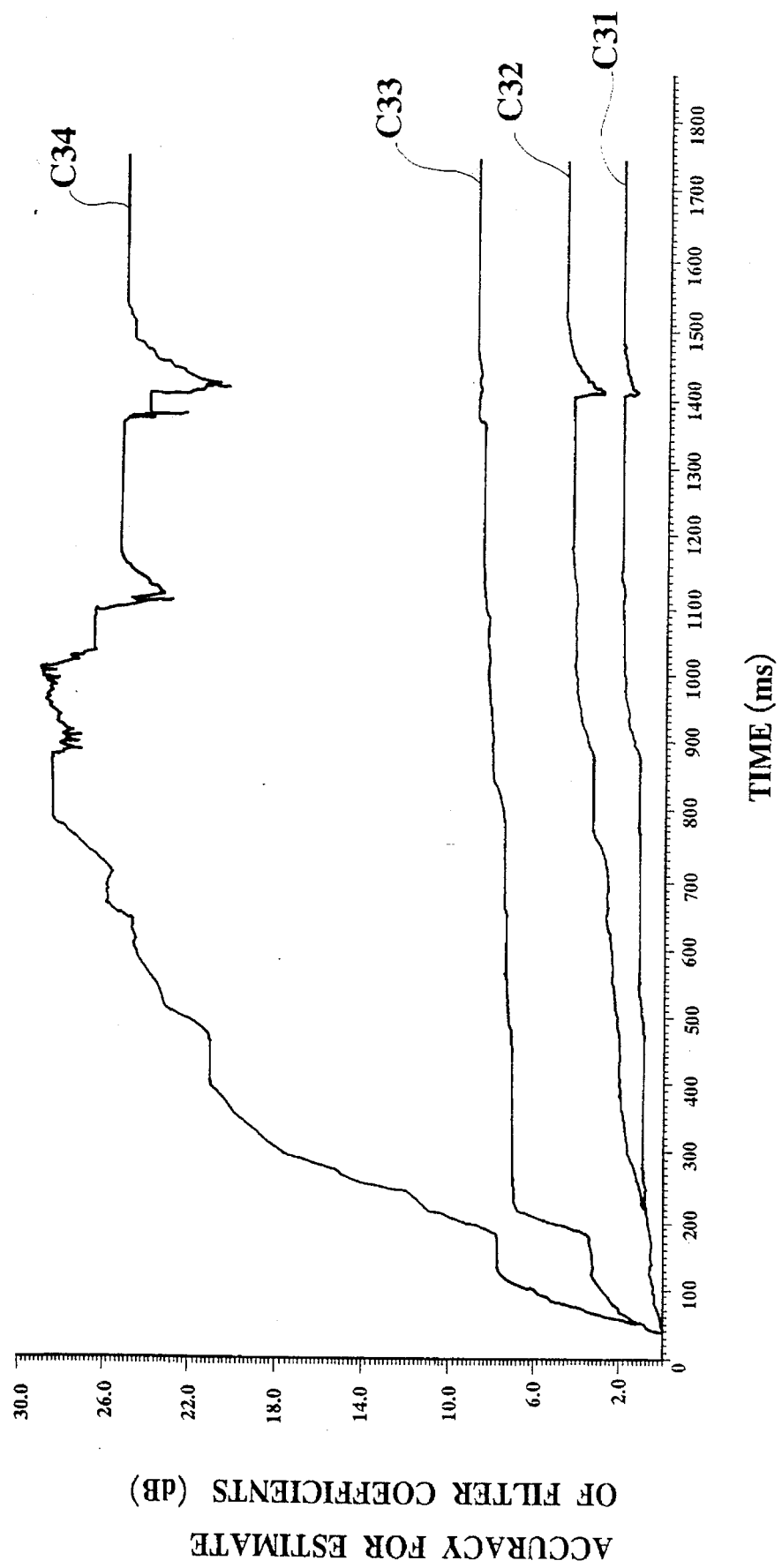
FIG. 22 is a graph of an accuracy for estimate of filter coefficients as a function of time, indicating the effect of the use of the addition of the wide frequency band noise and the spectral pre-whitening of the frequency spectrum.

Moreover, to illustrate the effect of the addition of the wide frequency band noise and the difference calculation process, FIG. 22 shows the accuracy of the estimate for the filter coefficients in a case of using the synthetic speech response of "ijoudeyorosiidesuka" (meaning "is that all?" in Japanese). In FIG. 22, a curve C31 indicates a case of not using both of the addition of the wide frequency band noise and the difference calculation process, a curve C32 indicates a case of using only the difference calculation process, a curve C33 indicates a case of using only the addition of the white noise having the power level lower than the synthetic speech response power level by 20 dB, and a curve C34 indicates a case of using both of the addition of the wide frequency band noise and the difference calculation process. It can be clearly seen in FIG. 22 that the simultaneous use of the addition of the wide frequency band noise and the difference calculation process can improve the accuracy of the estimate for the filter coefficients considerably.

Figure 23:
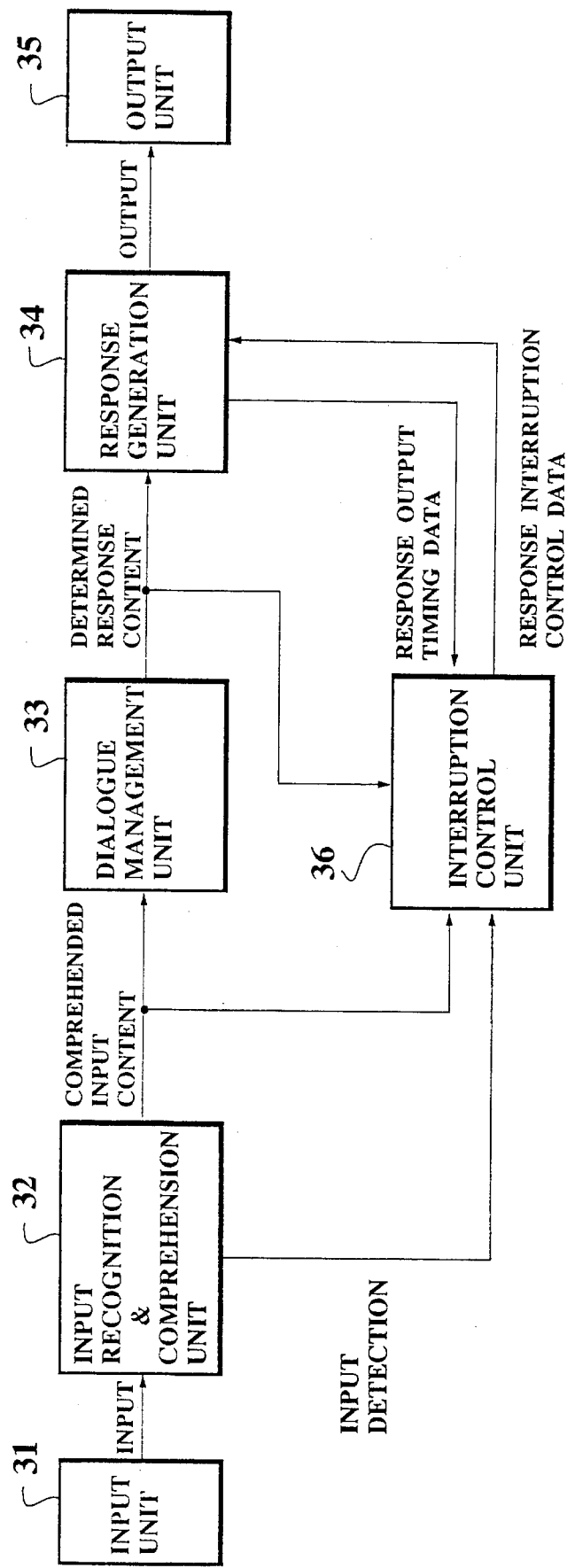
FIG. 23 is a schematic block diagram of a fifth embodiment of a speech dialogue system according to the present invention.

Referring now to FIG. 23, a fifth embodiment of a speech dialogue system according to the present invention will be described in detail.

The speech dialogue system of this fifth embodiment comprises: an input unit 31 for inputting input signals from a user which in general includes a speech input entered by a microphone, a text input entered by using a keyboard, and command input entered by using a pointing device such as a mouse or a touch panel; an input recognition and comprehension unit 32 for detecting, recognizing, and comprehending the input signals entered at the input unit 31; a dialogue management unit 33 for determining a response which in general includes a synthetic speech response and a visual response using text and graphics, appropriate for the content of the input signals recognized and comprehended at the input recognition and comprehension unit 32; a response generation unit 34 for generating the response output according to the content of response determined by the dialogue management unit 33; an output unit 35 for outputting the response output generated by the response generation unit 34 to the user; and an interruption control unit 36 for controlling modes of the response output from the response generation unit 34 to the output unit 35.

In this speech dialogue system of FIG. 23, the input recognition and comprehension unit 32 recognizes and comprehends the content of the speech input from the microphone by using the speech recognition method such as HMM (Hidden Markov Model) method or word spotting method, the content of the text input from the keyboard by using the letter series analysis, and the content of the command input from pointed position, movement direction, and movement speed indicated by the pointing device.

Then, according to the comprehended content of the input signals, the dialogue management unit 33 determines the appropriate response to be outputted next. For example, the dialogue management unit 33 has a number of possible responses such as those shown in FIGS. 24A to FIG. 24E, including a normal confirmation response, confirmation responses with emphasis on different phrases in the response, a warning response with emphasis on a selected phrase in the response, and a warning response with high overall importance. As shown in FIGS. 24A to 24E, each response is given in terms of phrases which constitute the response and their orders in the response, syllable and pitch information for each phrase of the response, and an importance indication for each phrase of the response.

Then, according to the determined response content, the response generation unit 34 generates the response output which in general includes a synthetic speech response and a visual response using text and graphics. At the same time, the response generation unit 34 generates response output timing data indicating the response components and their output timings in correspondence, according to which the generated response output is transmitted to the output unit 35, while these response output timing data are also supplied to the interruption control unit 36.

The interruption control unit 36 in turn generates response interruption control data for controlling the modes of the response output from the response generation unit 34 to the output unit 35, according to the presence of the input and the comprehended input content obtained by the input recognition and comprehension unit 32, the determined response content obtained by the dialogue management unit 33, and the response output timing data supplied from the response generation unit 34. The detail of the control of the modes of the response output using these response interruption control data will be described in detail below.

Figure 25:
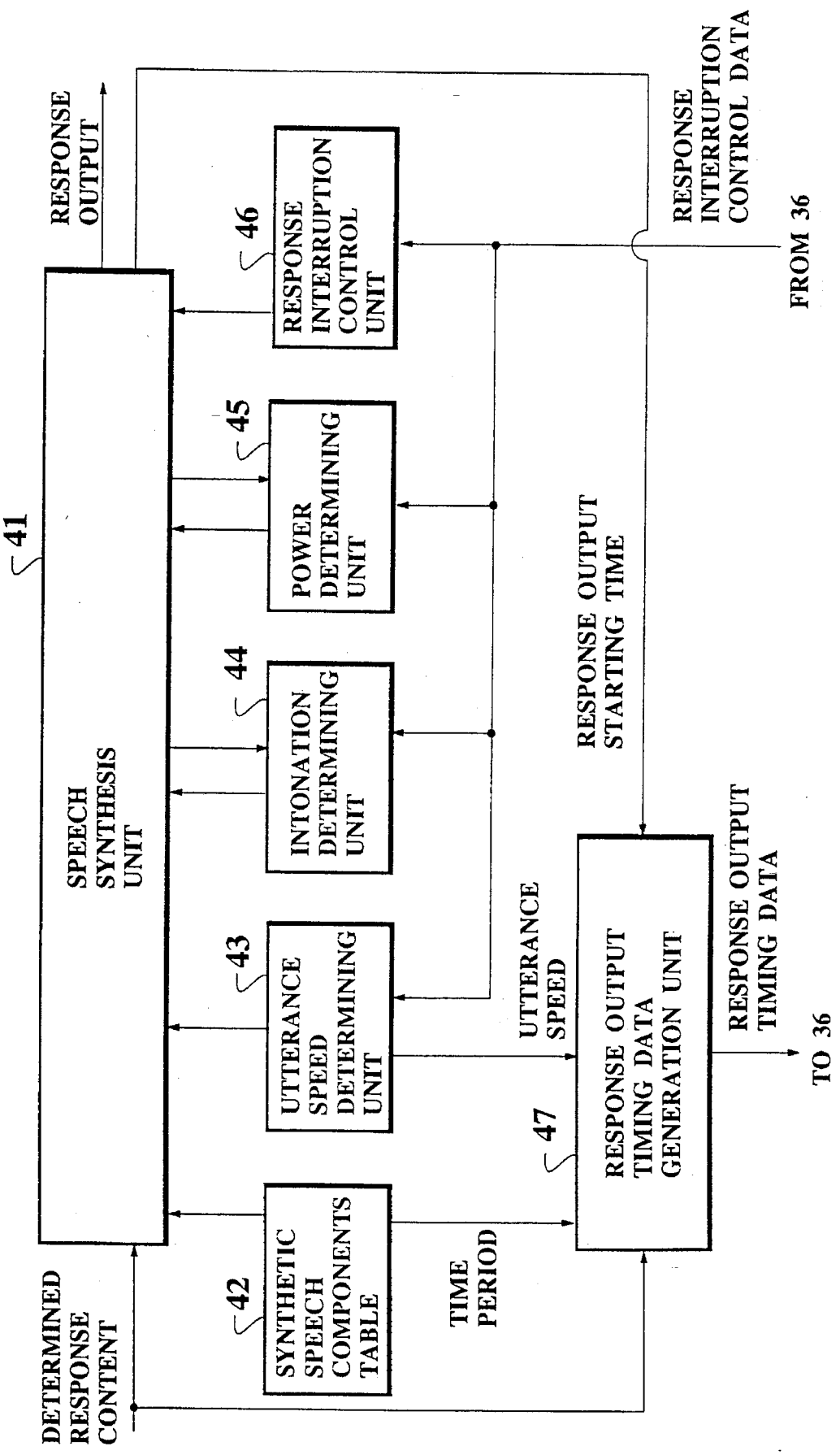
FIG. 25 is a detailed block diagram of a response generation unit in the speech dialogue system of FIG. 23.

In this fifth embodiment, the response generation unit 34 has a detail configuration as shown in FIG. 25, which comprises: a speech synthesis unit 41 for producing a synthetic speech response according to the determined response content supplied from the dialogue management unit 33; a synthetic speech components table 42 for memorizing the synthetic speech components that can be used in producing the synthetic speech response at the speech synthesis unit 41; an utterance speed determining unit 43 for determining the utterance speed for the synthetic speech response to be produced by the speech synthesis unit 41; an intonation determining unit 44 for determining the intonation for the synthetic speech response to be produced by the speech synthesis unit 41; a power determining unit 45 for determining the power for the synthetic speech response to be produced by the speech synthesis unit 41; a response interruption control unit 46 for controlling the interruption of the output of the synthetic speech response produced by the speech synthesis unit 41 according to the response interruption control data supplied from the interruption control unit 36; and a response output timing data generation unit 47 for generating the response output timing data to be supplied to the interruption control unit 36.

The response output timing data indicating the response components and their output timings in correspondence are generated by the response output timing data generation unit 47 by using the determined response content supplied from the dialogue management unit 33, the time period required for each synthetic speech component used in the response which is supplied from the synthetic speech components table 42, the utterance speed used in the response which is supplied from the utterance speed determining unit 43, and a response output starting time supplied from the speech synthesis unit 41. For example, with respect to the exemplary response shown in FIGS. 24A to 24C described above, the response output timing data generation unit 47 generates the response output timing data shown in FIG. 26, which include the phrases which constitute the response and their orders in the response, a time period required in outputting each phrase of the response, and a response output starting time.

The response interruption control data not only controls the output response by the response interruption control unit 46 to make interruption of the output of the synthetic speech response produced by the speech synthesis unit 41, but also controls the utterance speech determining unit 43, the intonation determining unit 44, and the power determining unit 45, to change the utterance speed, intonation, and power of the response output currently being outputted from the speech synthesis unit 41 according to the selected mode of the response output.

For example, the response interruption control data are given in a format as shown in FIG. 27, which include indications for an execution of an interruption, a change of the utterance speed, a change of the intonation, a change of the power, and a control start timing.

In a case of not executing the interruption, the entire response is outputted as it is, as indicated in FIG. 28. On the other hand, in a case of executing the interruption, the output of the phrase indicated by the control start timing and all the subsequent phrases of the response is interrupted, as indicated in FIG. 29.

Figure 30:
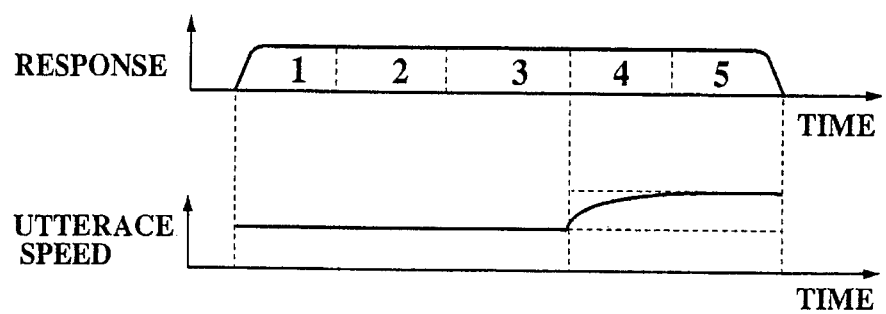

In a case of changing the utterance speed, the utterance speed of the phrase indicated by the control start timing and all the subsequent phrases of the response is changed by ±30%, for instance, at the utterance speed determining unit 43, as indicated in FIG. 30 for a case of increasing the utterance speed.

Figure 31:
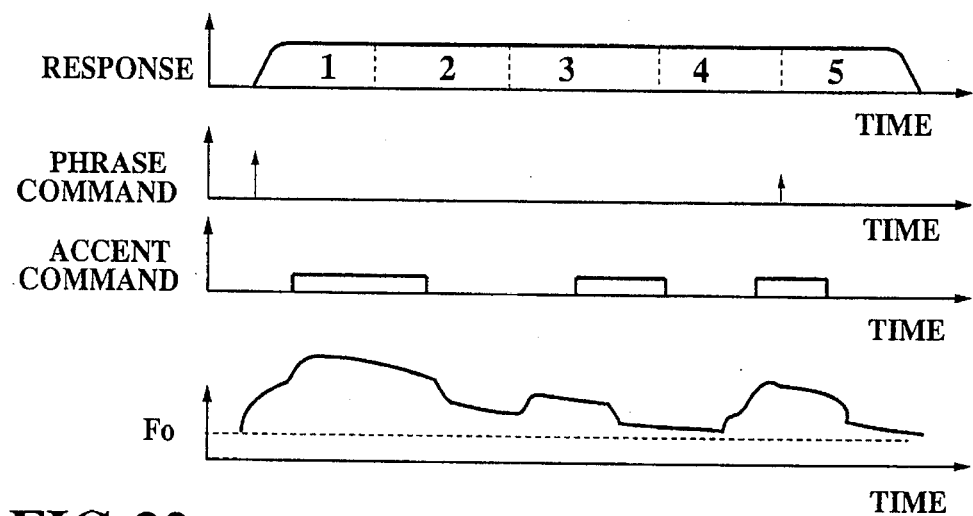
Figure 32:
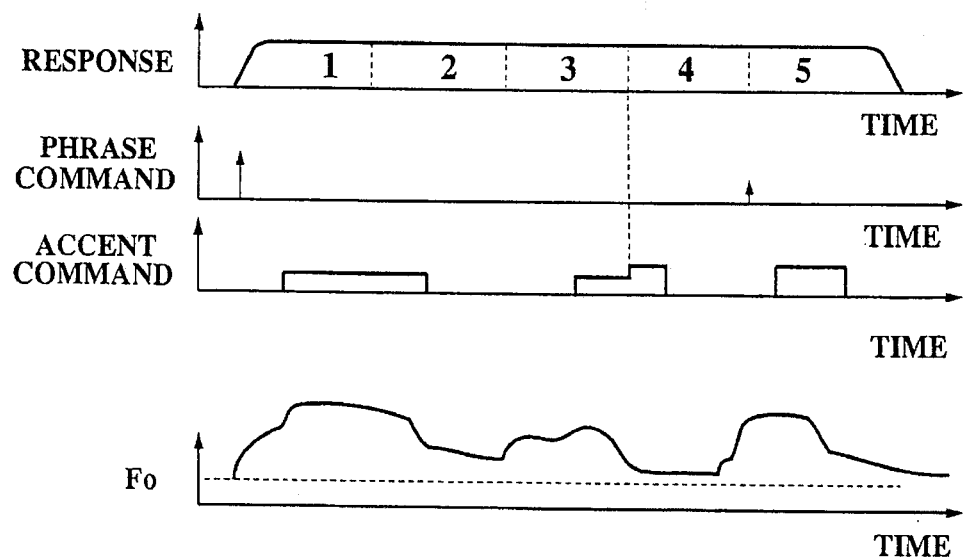

In a case of changing the intonation, the rate of change of the intonation such as a strength of an accent command is changed by ±50%, for instance, at the intonation determining unit 44, as indicated in FIG. 31 for a case of not changing the intonation and in FIG. 32 for a case of increasing the rate of change for the intonation. Here, the phrase command indicated in FIGS. 31 and 32 is of a conventionally known type, such as that disclosed by H. Fujisaki and K. Hirose in "Analysis of voice fundamental frequency contours for declarative sentences of Japanese", Journal of Acoustical Society of Japan, Vol. 5, No. 4, pp. 233–242, April 1984.

Figure 33:
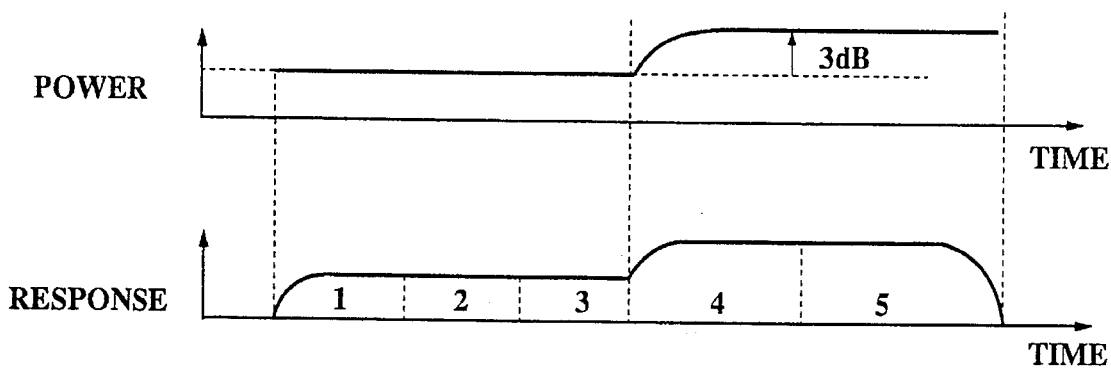
Figure 34:
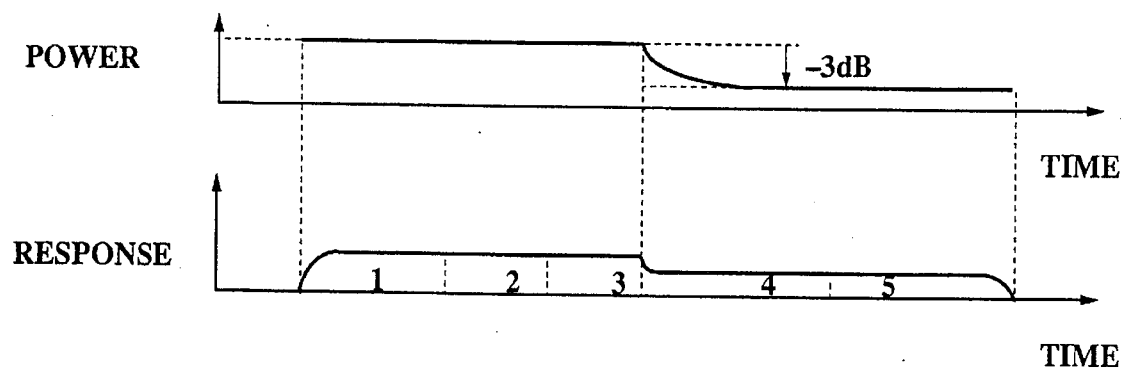
Figure 35:
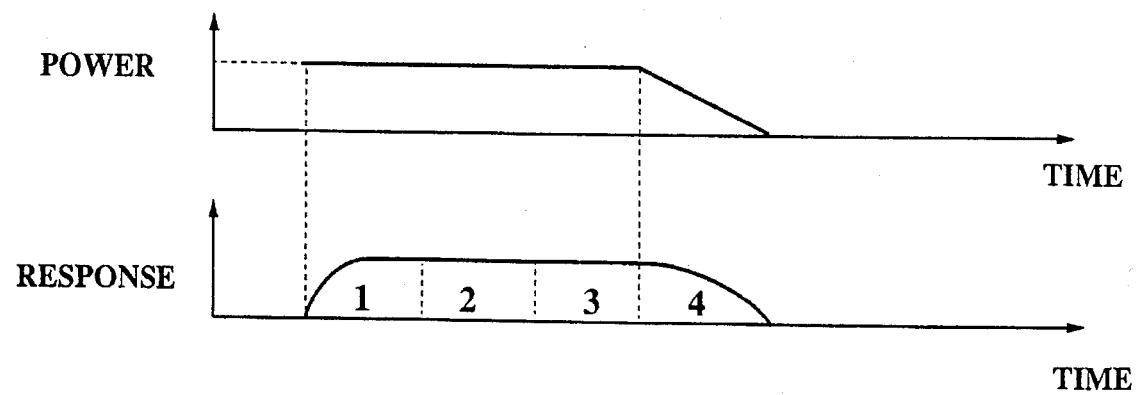

In a case of changing the power, the power (i.e., loudness) of the phrase indicated by the control start timing and all the subsequent phrases of the response is changed at the power determining unit 45, as indicated in FIG. 33 for a case of increasing the power, in FIG. 34 for a case of decreasing the power, and in FIG. 35 for a case of continuously decreasing the power to realize a fade out effect.

In further detail, the interruption control unit 36 determines the response interruption control data as follows.

First, in a case the input from the user is detected at the input recognition and comprehension unit 32, the interruption control unit 36 determines whether the response is currently being outputted or not, by referring to the output response timing data supplied from the response generation unit 34.

Then, in a case the response output has already been finished, the response interruption control data are not generated, and the next response to be outputted is determined by the dialogue management unit 33.

On the other hand, in a case the response output is currently being outputted, the response interruption control data are generated according to either one or both of the comprehended input content supplied from the input recognition and comprehension unit 32 and the determined response content supplied from the dialogue management unit 33.

More specifically, in a case of utilizing the comprehended input content, the importance of the comprehended input content is evaluated as indicated in FIG. 36, where the denial or correction is evaluated to be of higher importance than the consent, for instance. In a case the comprehended input content has the importance lower than a predetermined threshold importance, the output of the response currently being outputted is continued without incorporating any change, whereas otherwise the mode of the output of the response currently being outputted is modified appropriately.

In a case of utilizing the determined response content, the importance of the determined response content is evaluated as indicated in FIG. 37, which shows a case of evaluating the importance of the response as a whole. Alternatively, the importance may be evaluated in units of phrases in the response.

In a case of utilizing both of the comprehended input content and the determined response content, both of the evaluations of the comprehended input content and determined response content as described above are carried out.

Then, the response interruption control data are generated according to prescribed procedures, such as those indicated by the flow charts of FIGS. 38 to 41, as follows.

Figure 38:
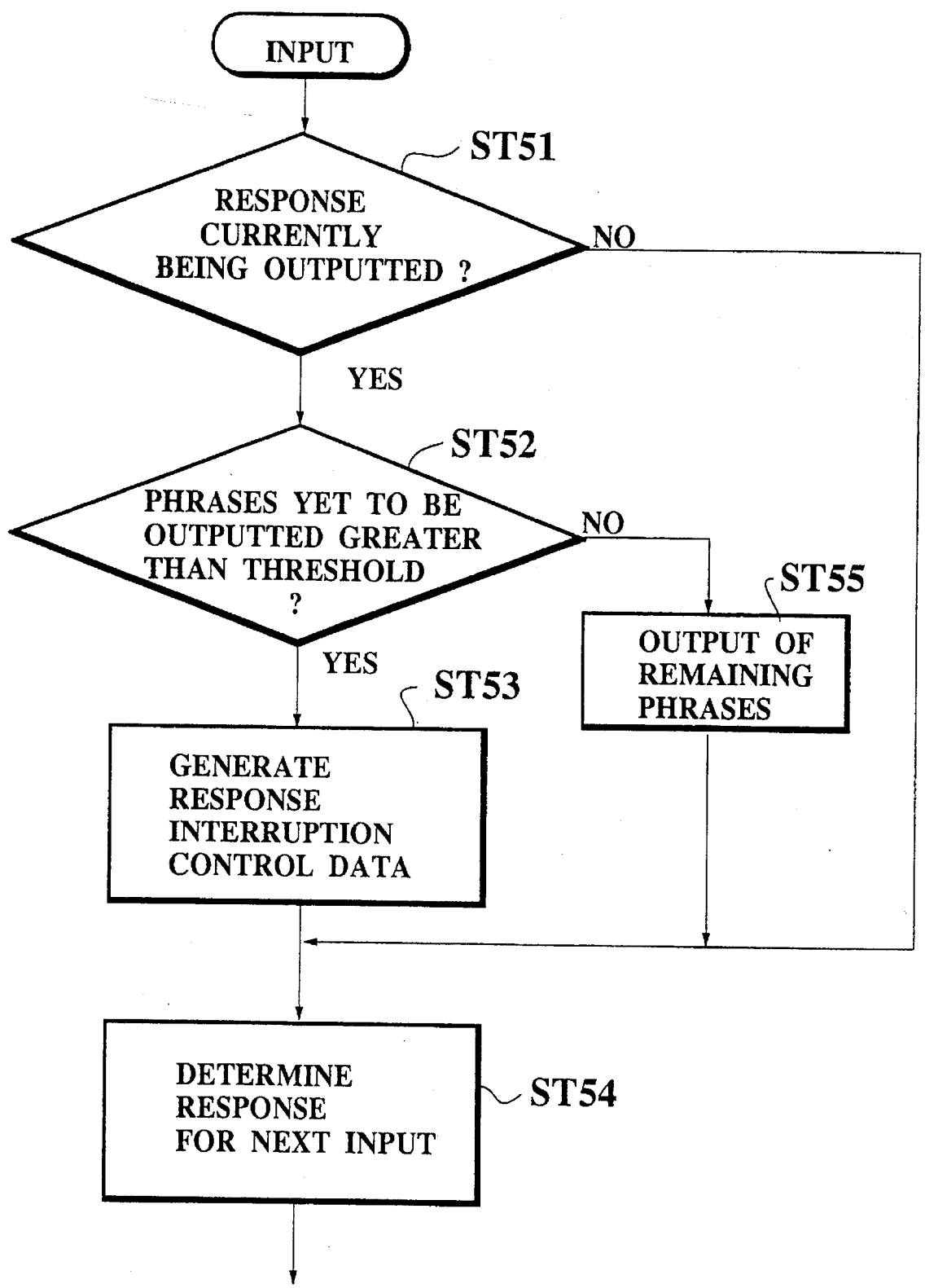
FIGS. 38 to 41 are flow charts of various exemplary procedures for controlling the mode of the output of the response by the interruption control unit of the speech dialogue system of FIG. 23.

Namely, FIG. 38 indicates a procedure in which the output of the response currently being outputted is continued to the end when the remaining phrases of the response which are not yet outputted is less than a predetermined threshold number at a time there is an input from the user. More specifically, in this procedure of FIG. 38, when there is an input from the user, first at the step ST51, whether the response is currently being outputted or not is determined, In a case the response is currently being outputted, next at the step ST52, whether the number of remaining phrases of the response which are yet to be outputted is greater than the predetermined threshold number or not is determined. In a case the number of remaining phrases is greater than the predetermined threshold, the response interruption control data for indicating the execution of the interruption of the output of the response, for example, is generated at the step ST53, and then the procedure proceeds to the determination of the response for the next input at the step ST54. On the other hand, in a case the number of remaining phrases is not greater than the predetermined threshold, the output of all of the remaining phrases of the response is carried out at the step ST55, before the procedure proceeds to the step ST54. In a case the response is not currently being outputted, the procedure proceeds from the step ST51 to the step ST54 directly.

Figure 39:
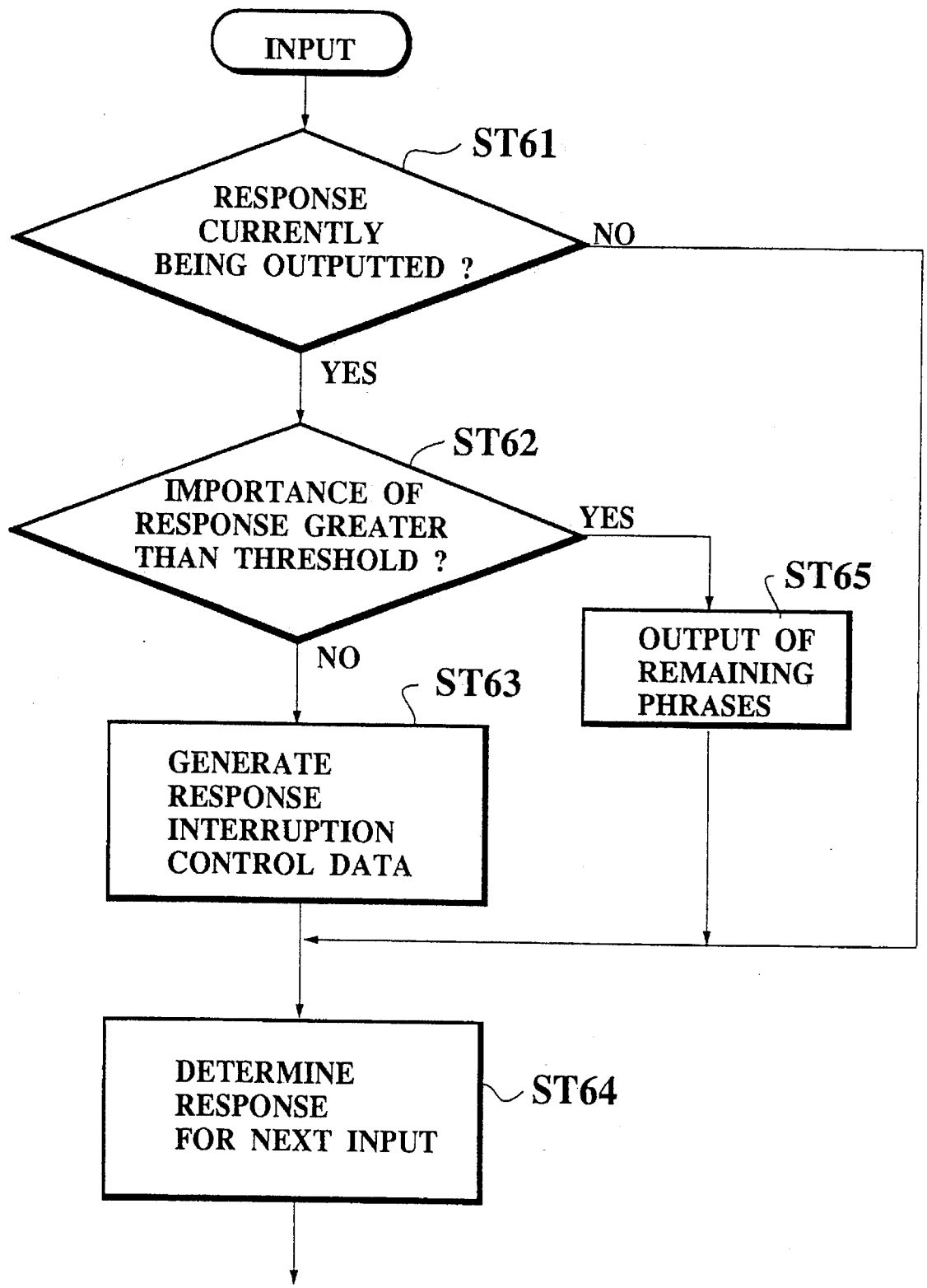

FIG. 39 indicates a procedure in which the interruption of the response by the input from the user is not allowed when the response currently being outputted is of high importance such as a warning response. More specifically, in this procedure of FIG. 39, when there is an input from the user, first at the step ST61, whether the response is currently being outputted or not is determined, In a case the response is currently being outputted, next at the step ST62, whether the importance of the response currently being outputted is greater than the predetermined threshold value or not is determined. In a case the importance of the response is not greater than the predetermined threshold, the response interruption control data for indicating the decreasing of the power and the slowing of the utterance speed for the response output, for example, is generated at the step ST63, and then the procedure proceeds to the determination of the response for the next input at the step ST64. On the other hand, in a case the importance of the response is not greater than the predetermined threshold, the output of all of the remaining phrases of the response is carried out at the step ST65, regardless of the presence of the input from the user, before the procedure proceeds to the step ST64. In a case the response is not currently being outputted, the procedure proceeds from the step ST61 to the step ST64 directly. Here, at the step ST65, the utterance speed of the response output may be increased or decreased while the pitch and the power of the response output are increased, so as to indicate the importance of the response to the user.

Figure 40:
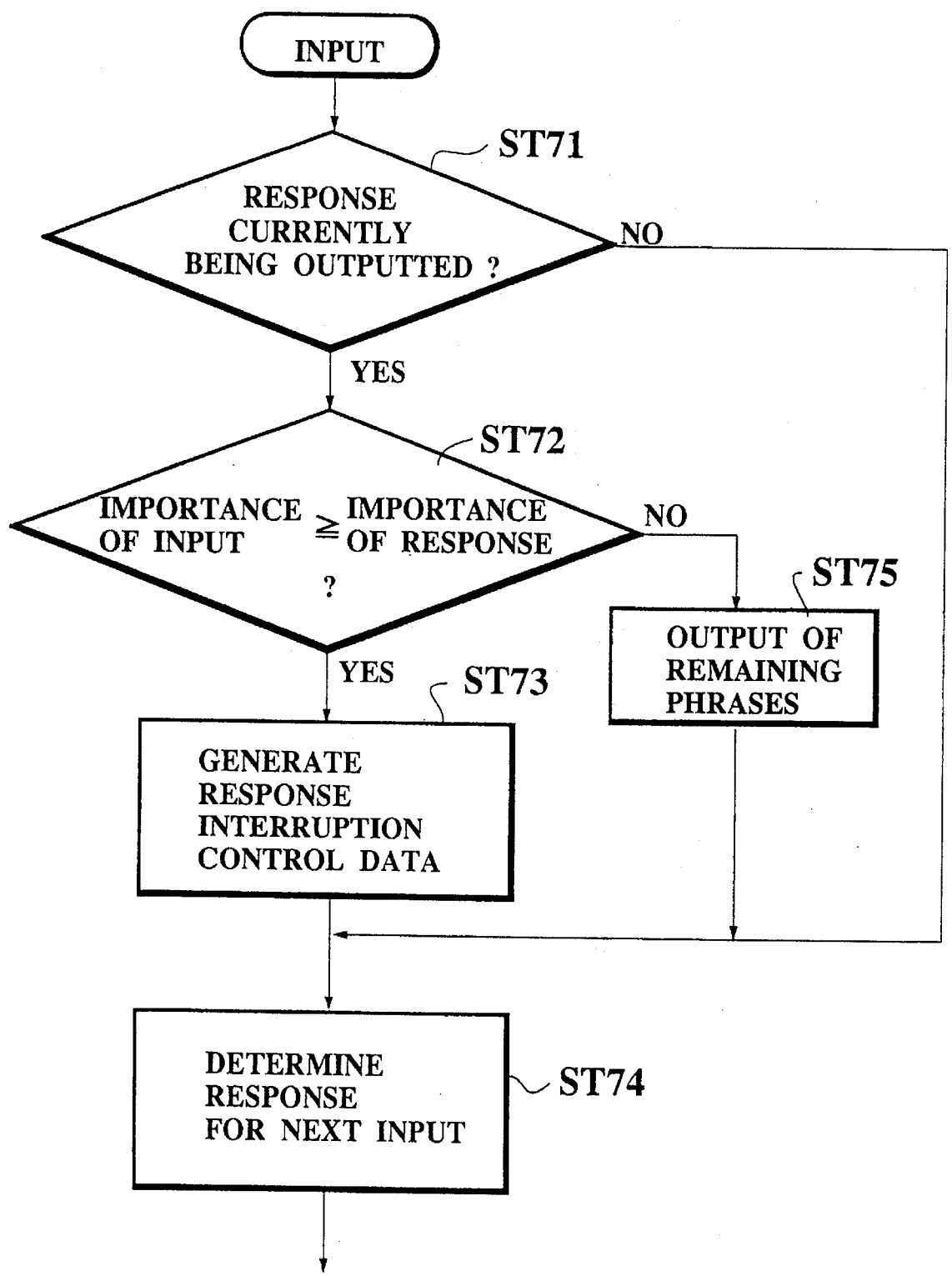

FIG. 40 indicates a procedure in which the the response interruption control data are generated when the importance of the input exceeds the importance of the response, at a time there is an input from the user. More specifically, in this procedure of FIG. 40, when there is an input from the user, first at the step ST71, whether the response is currently being outputted or not is determined, In a case the response is currently being outputted, next at the step ST72, whether the importance of the comprehended input content exceeds the importance of the response currently being outputted or not is determined. In a case the importance of the comprehended input content is greater than the importance of the response, the response interruption control data for indicating the execution of the interruption of the output of the response or the decreasing of the power and the slowing of the utterance speed for the response output, for example, is generated at the step ST73, and then the procedure proceeds to the determination of the response for the next input at the step ST74. On the other hand, in a case the importance of the comprehended input content is not greater than the importance of the response, the output of all of the remaining phrases of the response is carried out at the step ST75, regardless of the presence of the input from the user, before the procedure proceeds to the step ST74. In a case the response is not currently being outputted, the procedure proceeds from the step ST71 to the step ST74 directly.

Figure 41:
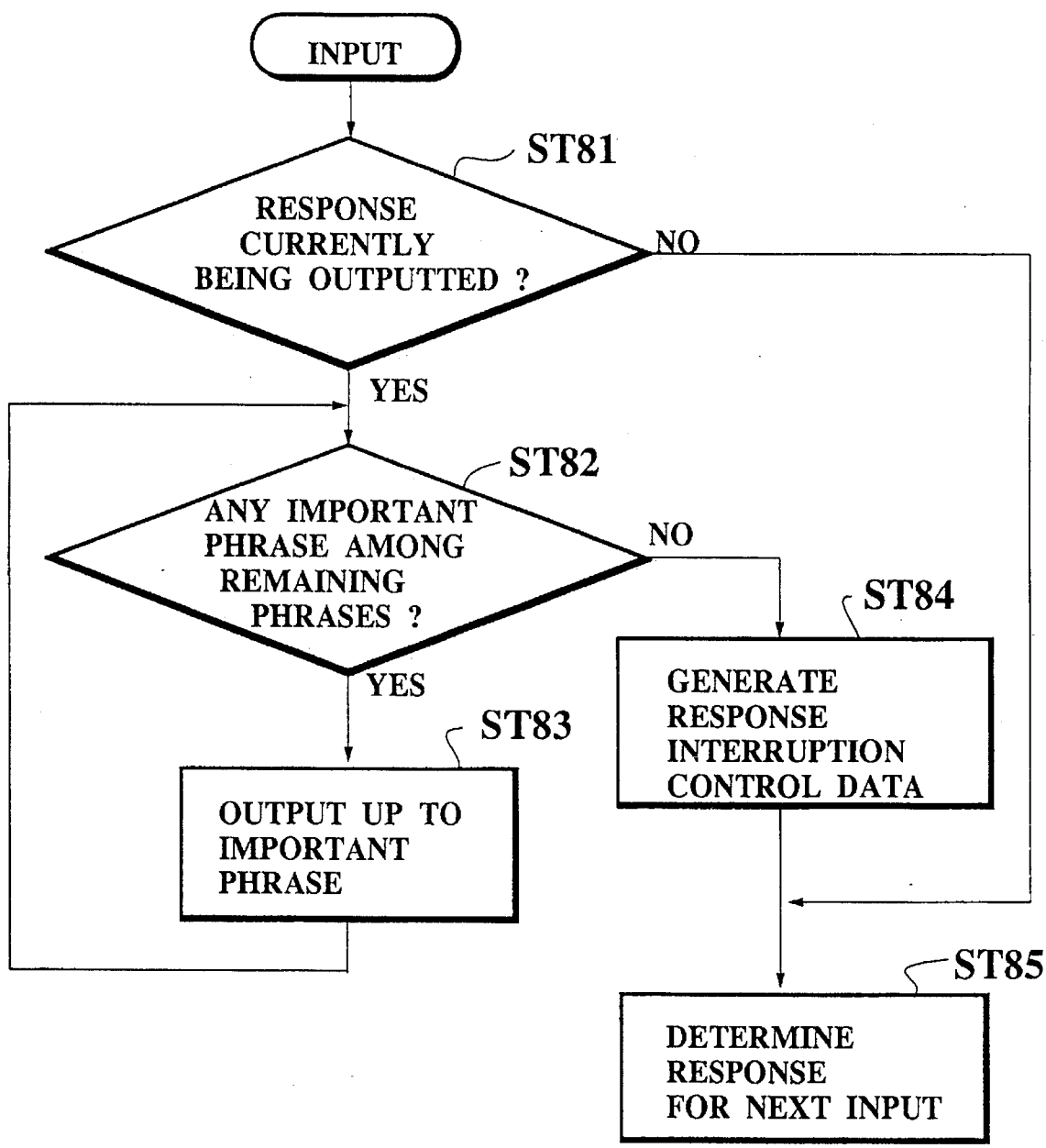

FIG. 41 indicates a procedure in which the the response interruption control data are generated according to the importance of each phrase of the response, at a time there is an input from the user. More specifically, in this procedure of FIG. 41, when there is an input from the user, first at the step ST81, whether the response is currently being outputted or not is determined, In a case the response is currently being outputted, next at the step ST82, whether there is a phrase of high importance among the remaining phrases of the response or not is determined. In a case there is such a phrase of high importance, the output of the response is continued up until this phrase of high importance is outputted at the step ST83 and the procedure returns to the step 82. Otherwise, the response interruption control data for indicating the execution of the interruption of the output of the response, for example, is generated at the step ST84, and then the procedure proceeds to the determination of the response for the next input at the step ST85. In a case the response is not currently being outputted, the procedure proceeds from the step ST81 to the step ST85 directly.

Thus, according to this fifth embodiment, it becomes possible to increase the input recognition rate by interrupting the output of the response whenever appropriate, and in addition, to improve the naturalness of the dialogue between the user and the speech dialogue system, so as to enable the smooth communication between the human user and the speech dialogue system.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A speech dialogue system, comprising:

microphone means for receiving a speech input uttered by a human speaker and outputting microphone output signals;

speech recognition means for receiving input signals and recognizing the speech input received by the microphone means;

synthetic speech response generation means for generating a synthetic speech response appropriate for the speech input recognized by the speech recognition means;

loudspeaker means for outputting the synthetic speech response to the human speaker; and synthetic speech response cancellation means for cancelling the synthetic speech response, which is outputted from the loudspeaker means and then received by the microphone means, from the microphone output signals, to obtain input signals to be supplied to the speech recognition means from which the speech recognition means recognizes the speech input, the synthetic speech response cancellation means further comprising:

look-up table means for memorizing speech characteristic information on the synthetic speech response to be outputted from the loudspeaker means;

adaptive filter means for adapting the synthetic speech response generated by the synthetic speech response generation means by multiplying the synthetic speech response with filter coefficients calculated according to the speech characteristic information memorized in the look-up table means, to obtain an adapted synthetic speech response; and subtractor means for subtracting the adapted synthetic speech response obtained by the adaptive filter means from the microphone output signals, to obtain the input signals supplied to the speech recognition means.

2. The speech dialogue system of claim 1, wherein the speech characteristic information memorized in the look-up table means indicates an auto-correlation characteristic of the synthetic speech response.

3. The speech dialogue system of claim 1, wherein the speech characteristic information memorized in the look-up table means indicates a power characteristic of the synthetic speech response.

4. The speech dialogue system of claim 1, further comprising control means for controlling an updating of the filter coefficients used in the adaptive filter means according to a presence of the speech input recognized by the speech recognition means.

5. The speech dialogue system of claim 4, wherein the control means sets values of the filter coefficients in the adaptive filter to values before the utterance of the speech input when the presence of the speech input is recognized by the speech recognition means.

6. The speech dialogue system of claim 5, wherein the control means controls the updating of the filter coefficients used in the adaptive filter means such that the filter coefficients are not changed unless a power level of the speech input is greater than a predetermined threshold.

7. The speech dialogue system of claim 1, further comprising speech segment detection means for detecting a speech segment in the input signals, wherein the speech recognition means recognize the speech input from the input signals only at the speech segment detected by the speech segment detection means.

8. The speech dialogue system of claim 7, wherein the speech segment detection means uses detection thresholds for determining the speech segment which vary according to a power level of the synthetic speech response to be cancelled at the synthetic speech response cancellation means.

9. The speech dialogue system of claim 8, wherein the speech segment detection means obtains the power level of the synthetic speech response by calculating a convolution of the synthetic speech response and an estimate for the filter coefficients.

10. The speech dialogue system of claim 9, wherein the estimate for the filter coefficients is obtained by adding a wide frequency band noise to the synthetic speech response.

11. The speech dialogue system of claim 9, wherein the estimate for the filter coefficients is obtained by a spectral pre-whitening of a frequency spectrum of the synthetic speech response.

12. A speech dialogue system, comprising:

microphone means for receiving a speech input uttered by a human speaker and outputting microphone output signals;

speech recognition means for receiving input signals and recognizing the speech input received by the microphone means;

synthetic speech response generation means for generating a synthetic speech response appropriate for the speech input recognized by the speech recognition means;

loudspeaker means for outputting the synthetic speech response to the human speaker; and synthetic speech response cancellation means for cancelling the synthetic speech response, which is outputted from the loudspeaker means and then received by the microphone means, from the microphone output signals, to obtain input signals to be supplied to the speech recognition means from which the speech recognition means recognizes the speech input, the synthetic speech response cancellation means further comprising:

adaptive filter means for adapting the synthetic speech response generated by the synthetic speech response generation means, to obtain an adaptive filter output;

convolution means for calculating a convolution of the adaptive filter output obtained by the adaptive filter means and the synthetic speech response generated by the synthetic speech response generation means;

subtractor means for subtracting the convolution calculated by the convolution means from the microphone output signals, to obtain the input signals supplied to the speech recognition means;

at least one smoothing filter means for smoothing the synthetic speech response generated by the synthetic speech response generation means; and switching means for controlling an operation of the adaptive filter means according to an output power level of the smoothing filter means.

13. The speech dialogue system of claim 7, wherein the smoothing filter means includes a first smoothing filter having a first time constant and a second smoothing filter having a second time constant which is larger than the first time constant, and the switching means stops the operation of the adaptive filter means when the output power level of the first smoothing filter is below a predetermined first threshold, and starts the operation of the adaptive filter means when the output power level of the second smoothing filter is above a predetermined second threshold.

14. The speech dialogue system of claim 13, wherein the filter coefficients used in the adaptive filter means are updated according to the output power level of the second smoothing filter.

15. The speech dialogue system of claim 12, wherein the synthetic speech response cancellation means further comprises two channel A/D converter means for inputting the synthetic speech response generated by the synthetic speech response generation means and the microphone output signals outputted by the microphone means into the synthetic speech response cancellation means synchronously.

16. The speech dialogue system of claim 12, further comprising speech segment detection means for detecting a speech segment in the input signals, wherein the speech recognition means recognize the speech input from the input signals only at the speech segment detected by the speech segment detection means.

\* \* \* \* \*